US012325052B1

(12) United States Patent
Gray et al.

(10) Patent No.: US 12,325,052 B1
(45) Date of Patent: Jun. 10, 2025

(54) BIOSAFETY CABINET WITH DIVIDED PLENUM

(71) Applicant: LABCONCO CORPORATION, Kansas City, MO (US)

(72) Inventors: Brandon Patrick Gray, Prairie Village, KS (US); Michael Brian Hays, Peculiar, MO (US); Victoria Grace Fincham, Shawnee, KS (US)

(73) Assignee: LABCONCO Corporation, Kansas City, MO (US)

( * ) Notice: Subject to any disclaimer, the term of this patent is extended or adjusted under 35 U.S.C. 154(b) by 212 days.

(21) Appl. No.: 18/144,340

(22) Filed: May 8, 2023

(51) Int. Cl.
| | | |
|---|---|---|
| *B08B 15/02* | (2006.01) | |
| *B01D 46/00* | (2022.01) | |
| *F24F 11/00* | (2018.01) | |
| *F24F 11/72* | (2018.01) | |

(52) U.S. Cl.
CPC ............ *B08B 15/023* (2013.01); *B01D 46/00* (2013.01); *F24F 11/0001* (2013.01); *F24F 11/72* (2018.01); *B01D 2279/65* (2013.01)

(58) Field of Classification Search
USPC .......................................................... 454/62
See application file for complete search history.

(56) References Cited

U.S. PATENT DOCUMENTS

| | | | |
|---|---|---|---|
| 2,667,185 A | | 1/1954 | Beavers |
| 2,715,359 A | * | 8/1955 | MacKintosh ......... B08B 15/023 |
| | | | 126/299 R |
| 2,779,265 A | * | 1/1957 | Liptay ................... B08B 15/023 |
| | | | 126/299 R |
| 3,745,908 A | * | 7/1973 | Mayberry ............. B08B 15/023 |
| | | | 454/61 |
| 4,098,174 A | * | 7/1978 | Landy ................... B08B 15/023 |
| | | | 55/DIG. 29 |

(Continued)

FOREIGN PATENT DOCUMENTS

| | | |
|---|---|---|
| CN | 208288650 U | 12/2018 |
| EP | 0726428 A2 | 2/1996 |

(Continued)

OTHER PUBLICATIONS

Operator's Manual, "SterilGARD, Class II, Type A2, Biological Safety Cabinet", Baker Company, Nov. 12, 2014 (6 pgs).

(Continued)

*Primary Examiner* — Joseph A Dillon, Jr.
(74) *Attorney, Agent, or Firm* — Stinson LLP

(57) ABSTRACT

A biosafety cabinet including a plenum and a divider positioned in the plenum. The divider divides the plenum into a supply section and an exhaust section. A blower is positioned adjacent the plenum and in fluid communication with the plenum. The blower is configured to simultaneously supply air to both the supply section and the exhaust section of the plenum. An exhaust filter is positioned between the exhaust section and an exhaust outlet. The air supplied to the exhaust section from the blower passes through the exhaust filter. A supply filter is positioned between the supply section and a work area. The air supplied to the supply section from the blower passes through the supply filter. An adjuster may be coupled to the divider to adjust a position of the divider in the plenum.

26 Claims, 14 Drawing Sheets

(56) References Cited

U.S. PATENT DOCUMENTS

| | | | | |
|---|---|---|---|---|
| 4,100,847 | A | * | 7/1978 | Norton .................. B08B 15/023 55/DIG. 29 |
| 4,434,711 | A | * | 3/1984 | Zboralski ................ B08B 15/02 454/62 |
| 4,517,883 | A | | 5/1985 | Levchenko et al. |
| 4,534,281 | A | | 8/1985 | Parks et al. |
| 4,785,722 | A | * | 11/1988 | Dollhopf ............... B08B 15/023 454/62 |
| 4,788,939 | A | * | 12/1988 | Peters .................... A01K 1/031 119/419 |
| 4,927,438 | A | * | 5/1990 | Mears .................... F24F 3/163 55/385.2 |
| 4,934,256 | A | | 6/1990 | Moss et al. |
| 5,225,167 | A | * | 7/1993 | Wetzel ..................... F24F 8/22 250/492.1 |
| 5,378,195 | A | * | 1/1995 | Beck ..................... B08B 15/023 454/62 |
| 5,380,244 | A | * | 1/1995 | Tipton .................. B08B 15/023 96/421 |
| 5,447,468 | A | | 9/1995 | Tener et al. |
| 5,665,128 | A | * | 9/1997 | Peters .................. B08B 15/023 55/385.2 |
| 5,716,267 | A | | 2/1998 | Hambleton et al. |
| 6,036,737 | A | * | 3/2000 | Smith ................... B08B 15/023 55/491 |
| 6,368,206 | B1 | | 4/2002 | Hunter et al. |
| 6,461,233 | B1 | | 10/2002 | Gilkison et al. |
| 6,896,712 | B2 | | 5/2005 | Ryan et al. |
| 7,014,674 | B2 | | 3/2006 | Ryan et al. |
| 7,022,151 | B2 | | 4/2006 | Ono |
| 7,048,625 | B2 | | 5/2006 | Anezaki et al. |
| 7,090,709 | B2 | | 8/2006 | Ono |
| 7,323,026 | B2 | | 1/2008 | Ono |
| RE40,276 | E | | 4/2008 | Hunter et al. |
| 7,531,017 | B2 | | 5/2009 | Ryan et al. |
| 8,163,052 | B2 | | 4/2012 | Ono |
| 8,940,065 | B2 | | 1/2015 | Rindoks |
| 9,095,802 | B2 | | 8/2015 | McCarthy et al. |
| 9,175,873 | B2 | | 11/2015 | Sheldon et al. |
| 9,833,778 | B2 | | 12/2017 | Rindoks et al. |
| 10,478,873 | B2 | | 11/2019 | Ruan et al. |
| 10,507,500 | B1 | | 12/2019 | Hunter et al. |
| 10,874,012 | B2 | * | 12/2020 | Kaneko .................... F24F 7/06 |
| 10,926,266 | B2 | | 2/2021 | Berberich et al. |
| 11,307,132 | B2 | | 4/2022 | Gulley et al. |
| 11,428,469 | B2 | | 8/2022 | Gray |
| 11,554,395 | B2 | * | 1/2023 | Kaneko .................... B01L 1/00 |
| 2005/0245188 | A1 | | 11/2005 | Wu et al. |
| 2007/0184769 | A1 | | 8/2007 | Lin |
| 2008/0278040 | A1 | | 11/2008 | McCarthy et al. |
| 2011/0244775 | A1 | | 10/2011 | Haugen et al. |
| 2011/0281514 | A1 | | 11/2011 | Haugen et al. |
| 2012/0083196 | A1 | | 4/2012 | Mockridge |
| 2020/0290100 | A1 | | 9/2020 | Kaneko et al. |
| 2020/0393147 | A1 | | 12/2020 | Kaneko et al. |
| 2021/0001324 | A1 | | 1/2021 | Kaneko et al. |
| 2021/0146348 | A1 | | 5/2021 | Kaneko et al. |

FOREIGN PATENT DOCUMENTS

| | | |
|---|---|---|
| EP | 1609541 B1 | 1/2005 |
| EP | 2151632 A1 | 2/2010 |
| WO | 2007134829 A1 | 11/2007 |
| WO | 2020264075 A1 | 12/2020 |

OTHER PUBLICATIONS

Operator's Manual, "SmartFlow, 1300 Series A2", Thermo Scientific, pp. 1-1 & 1-4, published prior to May 8, 2023 (2 pgs).

Operation & Maintenance Manual, "Labgard ES Energy Saver Class II, Type A2 Laminar Flow Biological Safety Cabinet", NuAire, Inc., Dec. 2010 (3 pgs).

User and Service Manual, "NordicSafe, Low Noise, Class II, Microbiological Safety Cabinet", Esco Technologies, Inc., Apr. 2013 (2 pgs).

Brochure, "Logic+ Class II Biosafety Cabinets", Labconco Corporation, Apr. 17, 2019 (28 pgs).

* cited by examiner

BIOSAFETY CABINET WITH DIVIDED PLENUM

BACKGROUND

Biological safety cabinets, otherwise known as biosafety cabinets, are laboratory containment devices typically equipped with High Efficiency Particulate Air (HEPA) filters. These biosafety cabinets are used in laboratories where microbiological and hazardous particulate are handled and provide both a sterile work area and a safe environment where a variety of experiments and studies can be performed. Biosafety cabinets typically have a frame that encloses the work area on all but one side. The remaining side provides an access opening to the work area that can be closed in whole or in part via a movable sash. The sash may be moved upwardly to provide access to the work area so that work can be performed. The sash may be moved downwardly to partially or completely close the work area. A blower unit is provided in the biosafety cabinet above the work area to provide clean down flow air to the work area. The blower is used to circulate air downwardly through a HEPA filter and then through the work area. A portion of this downward airflow combines with inflow air to form an "air curtain" at the front of the biosafety cabinet adjacent the access opening and passes beneath the work surface of the work area. The inflow portion of airflow is created by exhausting air through a HEPA filter out the top of the biosafety cabinet. Another portion of the downward airflow is directed to the back of the biosafety cabinet where it is then drawn upwardly through a plenum chamber. As the air moves downward through the work area, it may be contaminated by materials present within the work area. Therefore, prior to being exhausted into the room or removed outside the room by a separate building fume removal system, the air may be first passed through a HEPA exhaust filter.

The blower is of a size and powered to operate at a speed to provide sufficient airflow through the work area and establish the inflow airflow to insure that materials, including harmful contaminants, are contained within the work area and eventually passed to a filter area rather than escaping into the room or exhausted into the atmosphere. To this end, a portion of air is drawn into the biosafety cabinet at the front of the access opening formed when the sash is in an open or partially open position to block the outflow of air.

The amount of air drawn into the biosafety cabinet is in part dependent on the position of the movable sash as it determines the size of the access opening. Traditionally, biosafety cabinets are manufactured and calibrated to operate at a pre-determined maximum sash height. Typical sash heights are 8, 10, or 12 inches. A combination of detent mechanisms and alarm switches may be used to alert a user when the sash is not at the operational sash height ("OSH"). To change the OSH, a biosafety cabinet technician moves the detents and switches and re-calibrates the biosafety cabinet to ensure proper airflow. Recalibration may include adjusting the speed of one or more blowers, adjusting the position of one or more dampers, or removing or inserting plugs into an exhaust filter cover.

The prior art biosafety cabinets are typically provided with a sash grill located below the sash. This sash grill forms the lower-most surface of the access opening into the work area. Typically, the sash grill is provided with a number of perforations through which air drawn from outside the biosafety cabinet can flow, known as inflow air. The air flows through the sash grill openings, under the work surface, and upwardly through a plenum at the back of the biosafety cabinet to be recirculated and/or exhausted by a blower. Inside the biosafety cabinet, a portion of air, known as downflow air, flows downwardly from the blower, through a supply HEPA filter, and then through a diffuser into the work area. The front portion of this HEPA-filtered airflow enters the sash grill. The rear portion flows into perforations near the lower-back of the work area and is drawn into the plenum to be recirculated and/or exhausted.

Biosafety cabinets have conventionally been classified by "Type" based on the configuration of airflow within the biosafety cabinet as well as the final destination of the exhaust air. Type A2 biosafety cabinets ("BSCs") combine the mixed incoming air (inflow) and down flow air (downflow) and re-circulate approximately 70% of the combined air. The remaining air is exhausted after HEPA filtration, either back into the laboratory or via a building fume removal system.

Many conventional Type A2 BSCs have a blower that pressurizes a single plenum. As described above, the blower draws air from outside the biosafety cabinet through the sash grill openings and also air from within the work area of the biosafety cabinet. The blower supplies air to the single plenum, which is in fluid communication with both a supply filter and an exhaust filter. Air passing through the supply filter enters the work area of the biosafety cabinet, and air passing through the exhaust filter is exhausted from the biosafety cabinet. The blower must pressurize the plenum to a level that is higher than the highest pressure drop of the exhaust filter and the supply filter. Typically, the supply filter is selected with a higher pressure drop than the exhaust filter to ensure that the airflow through the exhaust filter is at a sufficient rate for safe operation. Selecting a supply filter with a higher pressure drop means that the blower must be operated at a higher speed to pressurize the plenum to a level above the pressure drop of the supply filter. Operating the blower at a higher speed causes the blower to consume more power and generate more noise. Further, operating the blower at a higher initial speed lowers the available life span of the filters. The blower speed continuously increases over time as the filters are loaded with contaminants and become more resistant to airflow. When the blower speed reaches its maximum, the filters must be replaced to ensure continued safe operation of the biosafety cabinet. If the blower is at a higher initial speed to overcome the pressure drop of the supply filter, there is less speed increase available until the blower reaches its maximum speed and the filters need to be replaced.

The airflow through each of the supply filter and the exhaust filter must be balanced to ensure safe operation of the biosafety cabinet. The airflow rate through each filter depends at least in part on the variation between the airflow resistances of the supply filter and the exhaust filter due to air flowing more easily through the filter with a lower resistance. A sliding damper is often positioned adjacent the exhaust filter to restrict the area of the exhaust filter that is directly exposed to the plenum. Even when using a sliding damper to attempt to balance the airflow through the filters, the airflow is still dependent on the variation in resistance between the filters. While the filters may be selected initially with resistances or pressure drops that ensure proper airflow through the filters, if the filters are loaded at different rates over time, it may not be possible to balance the airflow rate through the filters to achieve safe operating conditions. Use of the sliding damper also causes a higher resistance to airflow through the exhaust filter due to the restriction it presents to air flowing to the exhaust filter, which means the blower must be operated at a higher speed to achieve a desired airflow rate through the exhaust filter. Operating the blower at a higher speed consumes more power, generates more noise, and lowers available filter life.

To overcome some of the disadvantages of a biosafety cabinet with a single blower supplying air to a single plenum, some biosafety cabinets have two separate plenums each supplied with air from its own blower. A supply blower supplies air to a supply plenum, and an exhaust blower supplies air to an exhaust plenum. While this configuration may overcome some of the disadvantages set forth above, it is also more expensive to equip and operate a biosafety cabinet with two blowers. It consumes more energy than a single blower due to the inherent inefficiency of two blowers versus the inherent inefficiency of one blower.

BRIEF SUMMARY

A biosafety cabinet in accordance with an aspect of the invention described herein includes a divided plenum that defines two separate air passageways: a supply passageway extending from a supply inlet to a supply outlet, and an exhaust passageway extending from an exhaust inlet to an exhaust outlet. A single blower is configured to simultaneously supply air to both the supply passageway via the supply inlet and to the exhaust passageway via the exhaust inlet. An exhaust filter may be positioned within the exhaust passageway between the exhaust inlet and the exhaust outlet. In this manner, air supplied to the exhaust passageway from the blower passes through the exhaust filter. A supply filter may be positioned within the supply passageway between the supply inlet and supply outlet. In this manner, air supplied to the supply passageway from the blower passes through the supply filter. Because the two passageways are separate, airflow through the supply filter is independent of the pressure drop of the exhaust filter, and airflow through the exhaust filter is independent of the pressure drop of the supply filter. The divided plenum may be configured to be adjustable such that one or both of the passageways and/or one or both of the inlets may be enlarged or reduced in size. In some embodiments, an adjustable divider positioned within the plenum divides and separates the supply passageway and the exhaust passageway. In some embodiments, the adjustable divider is configured to be moveable in a manner that enlarges one passageway and/or inlet, while reducing the other passageway and/or inlet.

A biosafety cabinet in accordance with an aspect of the invention described herein includes a plenum and a divider positioned in the plenum. The divider divides the plenum into a supply section and an exhaust section. A blower is positioned adjacent the plenum and/or in fluid communication with the plenum. The blower is configured to simultaneously supply air to both the supply section and the exhaust section of the plenum. An exhaust filter is positioned between the exhaust section and an exhaust outlet. The air supplied to the exhaust section from the blower passes through the exhaust filter. A supply filter is positioned between the supply section and a work area. The air supplied to the supply section from the blower passes through the supply filter. The air supplied to the exhaust section from the blower may pass through the exhaust filter without entering the supply section, and the air supplied to the supply section from the blower may pass through the supply filter without entering the exhaust section.

Dividing the plenum into a supply section and an exhaust section each simultaneously pressurized by the blower may allow the biosafety cabinet to be operated in a more efficient manner than conventional biosafety cabinets having a single plenum pressurized by a blower. The speed of the blower can be set at a level so that the air within each of the supply section and the exhaust section is at a pressure just above the resistance or pressure drop of the supply filter and the exhaust filter, respectively. This speed is typically lower than the blower speed of a conventional biosafety cabinet, which needs to be set to generate enough positive pressure within the plenum to force air through the filter with the highest resistance. The filters of the biosafety cabinet described herein may also be selected to have a lower pressure drop than a conventional biosafety cabinet because airflow through the supply filter is independent of the pressure drop of the exhaust filter and airflow through the exhaust filter is independent of the pressure drop of the supply filter. The blower can be operated at a lower speed when the filters have a lower pressure drop, which reduces the power consumption and noise of the blower. Further, operating the blower at a lower speed extends the life of the filters because the filters may be loaded for a longer time period before the blower reaches its maximum operating speed.

In some embodiments, an adjuster is coupled to the divider. The adjuster is configured to adjust a position of the divider in the plenum. Adjustment of the divider in a first direction increases a volume of the supply section, and adjustment of the divider in a second direction increases a volume of the exhaust section. Adjusting the divider allows a technician to change the relative airflow rates through the exhaust filter and the supply filter independently of the variation between the airflow resistances of the supply filter and the exhaust filter.

The adjuster may include a cable attached to one end of the divider. The cable can be pulled to adjust the divider in one of the first direction or the second direction, and the cable can be pushed to adjust the divider in the other direction. The adjuster may alternatively include a motor that is operable to move one end of the divider.

Further, in some embodiments, the exhaust filter includes an inlet surface exposed to the exhaust section of the plenum. The exhaust section of the plenum is configured so that there is an unrestricted airflow path in the exhaust section from the blower to the inlet surface of the exhaust filter. With an unrestricted airflow path, the blower may be operated at a lower speed to achieve a desired airflow rate through the exhaust filter than if the airflow path was restricted. Operating the blower at a lower speed requires less power consumption and reduces the noise of the blower.

Another aspect of the invention described herein is directed to a method of supplying filtered air to a work area of a biosafety cabinet. The method includes the following steps: (a) providing a biosafety cabinet having a divided plenum that defines a supply passageway extending from a supply inlet to a supply outlet, and an exhaust passageway extending from an exhaust inlet to an exhaust outlet, wherein the supply passageway and exhaust passageway are separate from one another; (b) simultaneously supplying air to both the supply passageway and the exhaust passageway via a blower supplying air to the supply inlet and the exhaust inlet; (c) filtering the air supplied to the exhaust passageway via an exhaust filter positioned within the exhaust passageway between the exhaust inlet and the exhaust outlet; (d) filtering the air supplied to the supply passageway via a supply filter positioned within the supply passageway between the supply inlet and the supply outlet; and (e) setting the speed of the blower at a level such that the air within each of the supply passageway and the exhaust passageway is at a pressure above the resistance or pressure drop of the supply filter and the exhaust filter, respectively. In some embodiments, the method additionally includes the step of: (f) adjusting the size of one or both of the passageways and/or one or both of the inlets to balance the airflow rates through the filters. In some embodiments, adjusting the size of one or both of the passageways and/or one or both of the inlets is accomplished by moving an adjustable divider that divides and separates the supply passageway and the exhaust passageway. In some embodiments, the adjustable divider is moved to simultaneously enlarge one passageway and/or inlet, and reduce the other passageway and/or inlet.

A method of supplying filtered air to a work area of a biosafety cabinet in accordance with an aspect of the invention described herein includes the steps of: (a) providing a biosafety cabinet having a plenum with a divider that divides the plenum into a supply section and an exhaust section; (b) simultaneously supplying air to both the supply section and the exhaust section via a blower positioned adjacent the plenum and/or in fluid communication with the plenum; (c) filtering the air supplied to the exhaust section via an exhaust filter positioned between the exhaust section and an exhaust outlet; (d) filtering the air supplied to the supply section via a supply filter positioned between the supply section and a work area; and (e) setting the speed of the blower at a level such that the air within each of the supply section and the exhaust section is at a pressure above the resistance or pressure drop of the supply filter and the exhaust filter, respectively. In some embodiments, the method additionally including the step of (f) adjusting the volume of each section by moving the divider.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION

Figure 1:
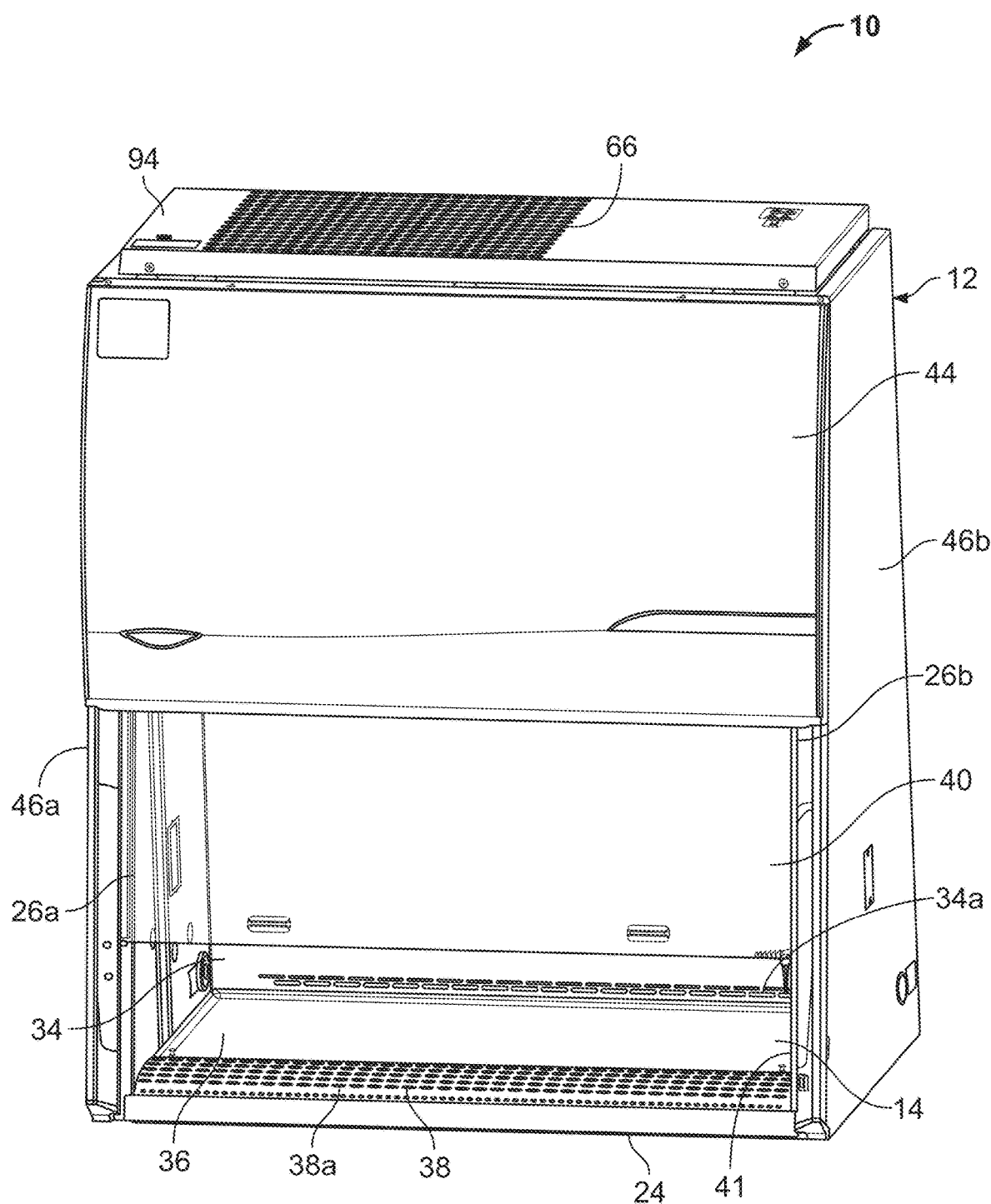
FIG. 1 is a perspective view of a biosafety cabinet in accordance with an exemplary embodiment of the invention described herein.
Figure 4:
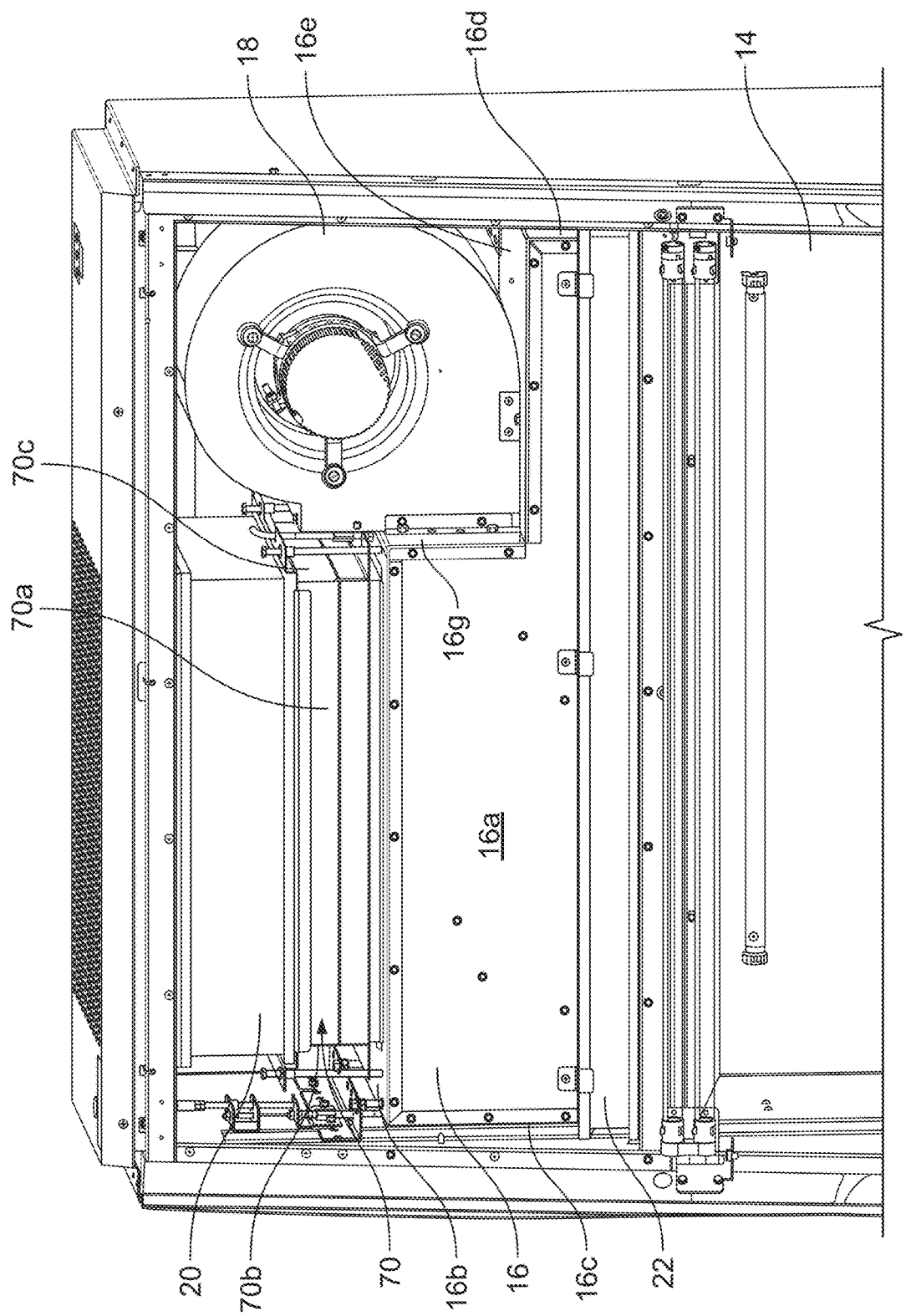
FIG. 4 is a front perspective view of an upper portion of the biosafety cabinet shown in FIG. 1 with a front cover and a front panel of the biosafety cabinet removed.

A biological safety cabinet, or biosafety cabinet, in accordance with an embodiment of the invention described herein is identified with the reference number 10 in FIG. 1. The biosafety cabinet 10 includes a housing 12 that defines a work area 14 in a lower part of the biosafety cabinet 10. As shown in FIG. 4, the biosafety cabinet 10 contains a plenum 16, a blower 18, an exhaust filter 20, and a supply filter 22 in an upper part of the biosafety cabinet 10. The blower 18 is generally operable to draw air from the work area 14 and from outside the biosafety cabinet 10, provide a portion of that air to the work area 14 through the supply filter 22, and exhaust a portion of that air through the exhaust filter 20. As described in more detail below, the biosafety cabinet 10 is further adjustable to alter the flow rate of the air passing through the supply filter 22 and the exhaust filter 20.

Figure 3:
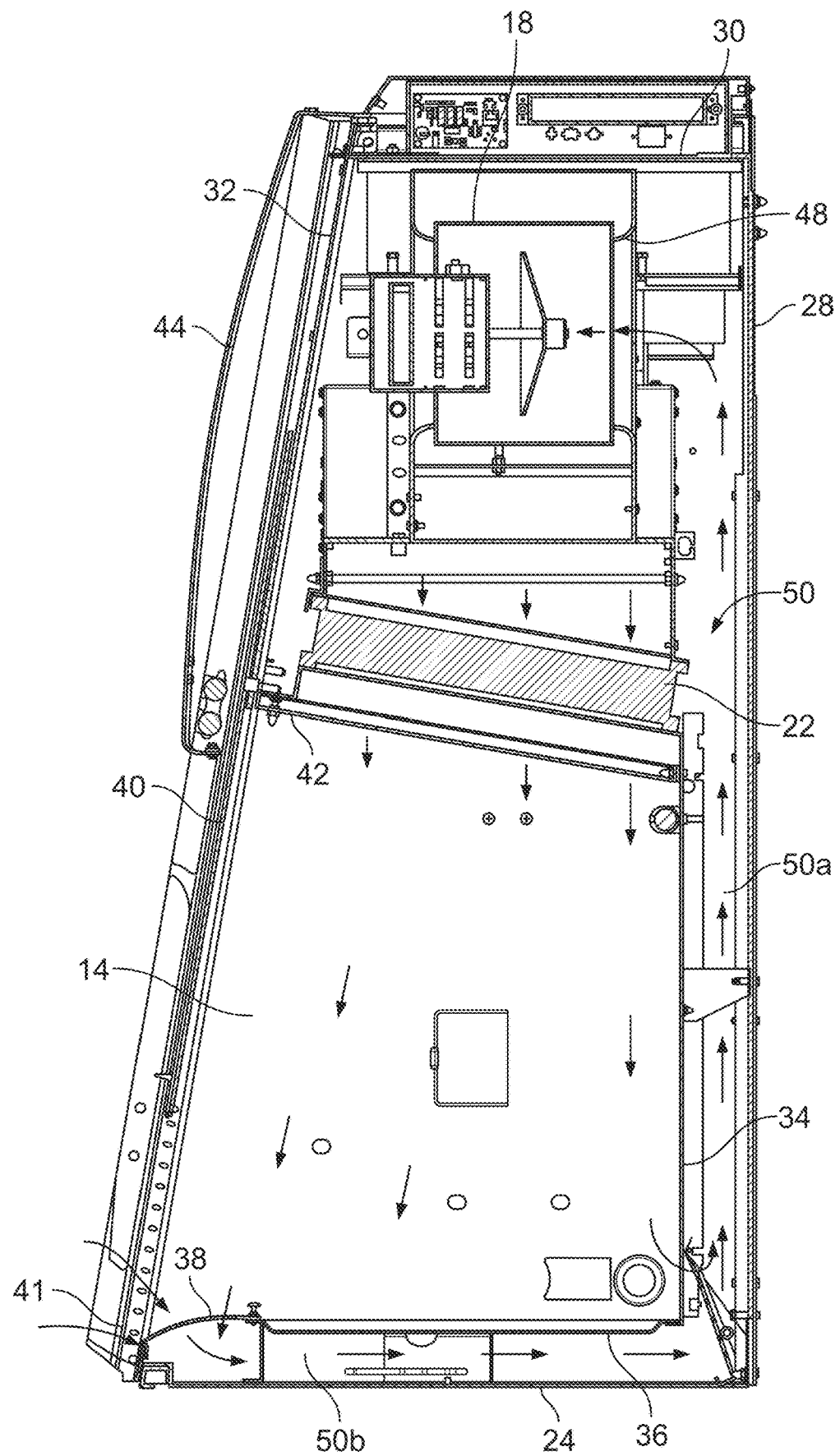
FIG. 3 is a cross-sectional view taken through the line 3-3 in FIG. 2.

Referring to FIGS. 1 and 3, the housing 12 has a bottom panel 24 and a pair of upwardly extending opposing side panels 26a-b which are joined to the bottom panel 24, such as by fasteners or welding. Extending upwardly from the bottom panel 24 and rigidly coupled between the side panels 26a-b is a rear panel 28 (FIG. 3). The side panels 26a-b and the rear panel 28 extend upwardly from the bottom panel 24 to a top panel 30 (FIG. 3). A front panel 32 (FIG. 3) extends between the side panels 26a-b and downward from the top panel 30 approximately half-way toward the bottom panel 24. A baffle 34 extends between the side panels 26a-b and is spaced inward from the rear panel 28. The bottom of the baffle 34 is spaced a distance above the bottom panel 24, as shown in FIG. 3. Openings 34a (FIG. 1) formed in a lower portion of the baffle 34 allow air from inside the work area 14 to be drawn by the blower 18 into the space between the baffle 34 and the rear panel 28.

A work surface 36 is suspended above the bottom panel 24 and extends from the baffle 34 to a sash grill 38. The work surface 36 also extends between the side panels 26a-b. The work surface 36 is used to hold objects necessary to perform experiments within biosafety cabinet 10, such as beakers, flasks, and other conventional lab ware. The sash grill 38 extends generally along the front of biosafety cabinet 10 between the side panels 26a-b. The sash grill 38 further extends forward from the work surface 36 to the bottom panel 24. The sash grill 38 includes openings 38a allowing air from outside the work area 14 to be drawn by the blower 18 into the space between the work surface 36 and the bottom panel 24.

A movable sash 40 is mounted between the side panels 26a-b in a manner allowing it to be moved upwardly and downwardly. The sash 40 is movable to alter the size of a front opening 41 of the biosafety cabinet 10 through which the work area 14 is accessible. An air diffuser plate 42 extends between the side panels 26a-b and from the baffle 34 to the front panel 32. The air diffuser plate 42 is positioned beneath the supply filter 22, as shown in FIG. 3, and is perforated to allow air passing through the supply filter 22 to enter the work area 14. The work surface 36, baffle 34, side panels 26a-b, air diffuser plate 42, and sash 40 define the work area 14.

A front cover 44 is positioned in front of the front panel 32 and joined to the side panels 26a-b and top panel 30. Opposing side covers 46a-b extend from the front cover 44 rearward to the rear panel 28. Panels 24, 26a-b, 28, 30, and 32, as well as baffle 34, work surface 36, sash grill 38, and air diffuser plate 42 may be made from metal such as stainless steel.

Referring to FIG. 3, the blower 18 has an inlet 48 that draws air from the work area 14 through a recirculation duct 50. The recirculation duct 50 includes a rear section 50a that is positioned between the rear panel 28 and the baffle 34 and a lower section 50b that is positioned between the bottom panel 24 and the work surface 36. The lower section 50b of the recirculation duct is in fluid communication with the work area 14 through the openings in the sash grill 38, and the rear section 50a is in fluid communication with the work area 14 through the openings in the lower portion of the baffle 34. As the blower 18 operates, it draws air from the work area 14 through the recirculation duct 50 and the openings in the sash grill 38 and baffle 34. The blower 18 also draws ambient air from outside the biosafety cabinet 10, which passes through the front opening 41 and through the openings in the sash grill 38 into the recirculation duct 50.

Figure 5:
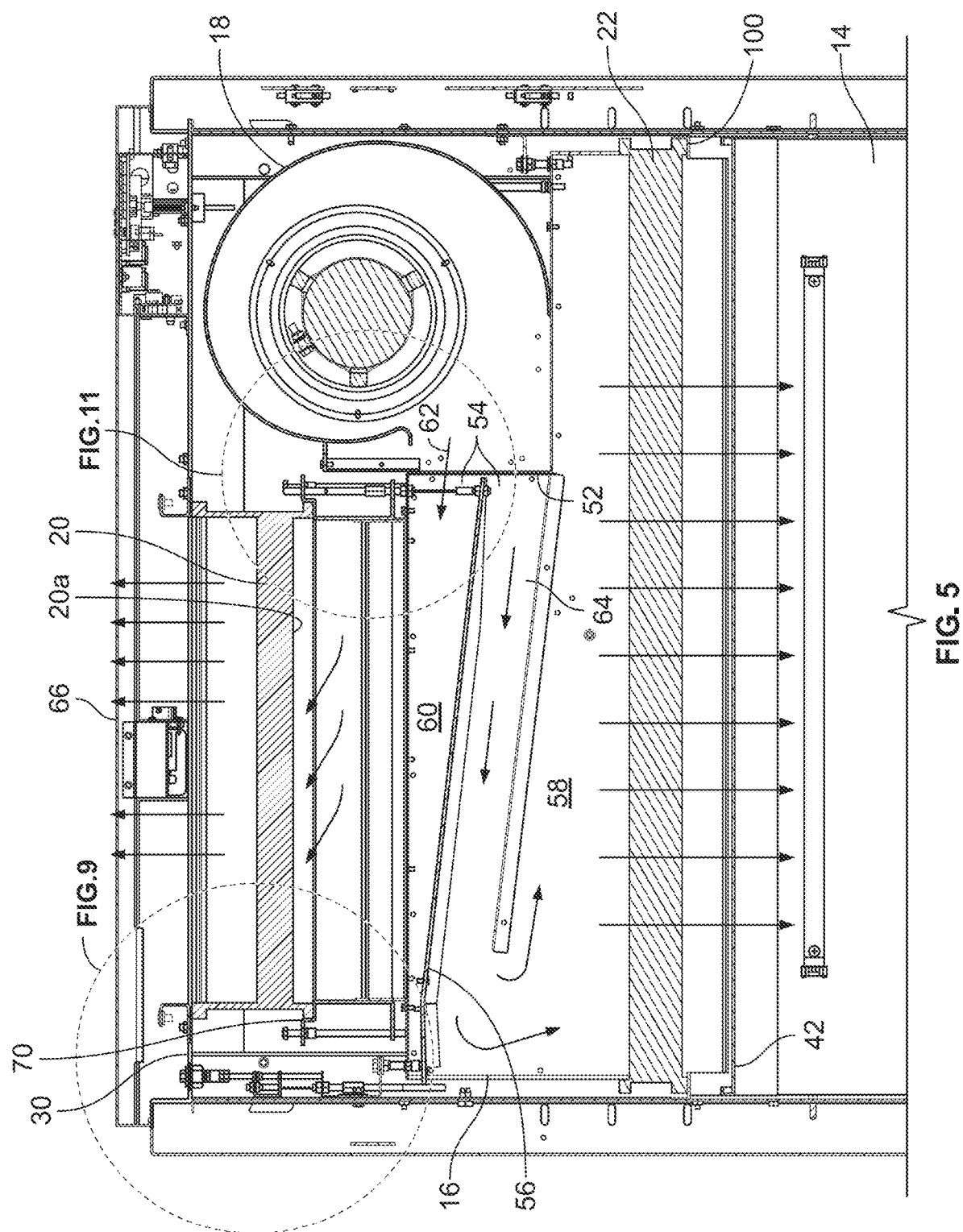
FIG. 5 is a cross-sectional view of the upper portion of the biosafety cabinet taken through the line 5-5 in FIG. 2.
Figure 6:
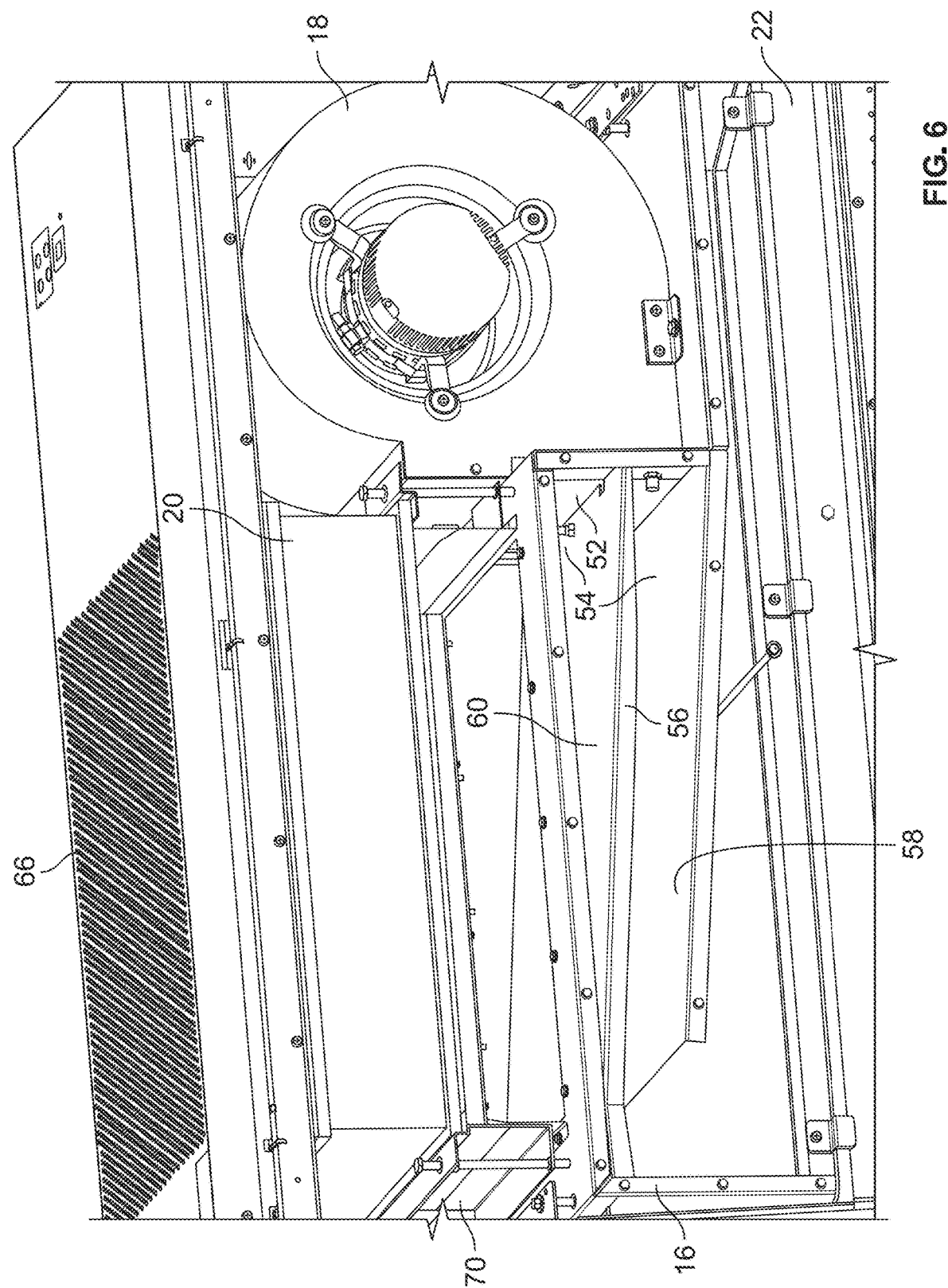
FIG. 6 is a front perspective view of the upper portion of the biosafety cabinet with the front cover and the front panel of the biosafety cabinet removed and a front wall of a plenum removed.

As shown in FIGS. 5 and 6, the blower 18 has an outlet 52 that supplies air to the interior of the plenum 16 through an inlet 54 of the plenum 16. The blower 18 is mounted to the plenum 16 so that substantially all of the air exiting the blower 18 enters the plenum 16 through the inlet 54. A divider 56 positioned in the plenum 16 divides the plenum 16 into a supply section 58 and an exhaust section 60. Air from the blower 18 that enters the inlet 54 of the plenum 16 is divided by the divider 56 into exhaust air 62 (FIG. 5) that enters the exhaust section 60 and supply air 64 that enters the supply section 58. All of the exhaust air 62 passes through the exhaust filter 20 and exits the biosafety cabinet 10 through an exhaust outlet 66. All of the supply air 64 passes through the supply filter 22 and enters the work area 14 through the air diffuser plate 42. The blower 18 simultaneously supplies the exhaust air 62 to the exhaust section 60 and the supply air 64 to the supply section 58. The blower 18 is further operable to simultaneously maintain a supply air pressure within the supply section 58 above an ambient air pressure, and an exhaust air pressure within the exhaust section 60 above the ambient air pressure. As described in more detail below, the divider 56 is adjustable in order to modify the relative flow rates of the exhaust air 62 and the supply air 64 (e.g., the divider 56 may be adjusted to increase the flow rate of the exhaust air 62 while decreasing the flow rate of the supply air 64, or the divider 56 may be adjusted to increase the flow rate of the supply air 64 while decreasing the flow rate of the exhaust air 62).

Figure 7:
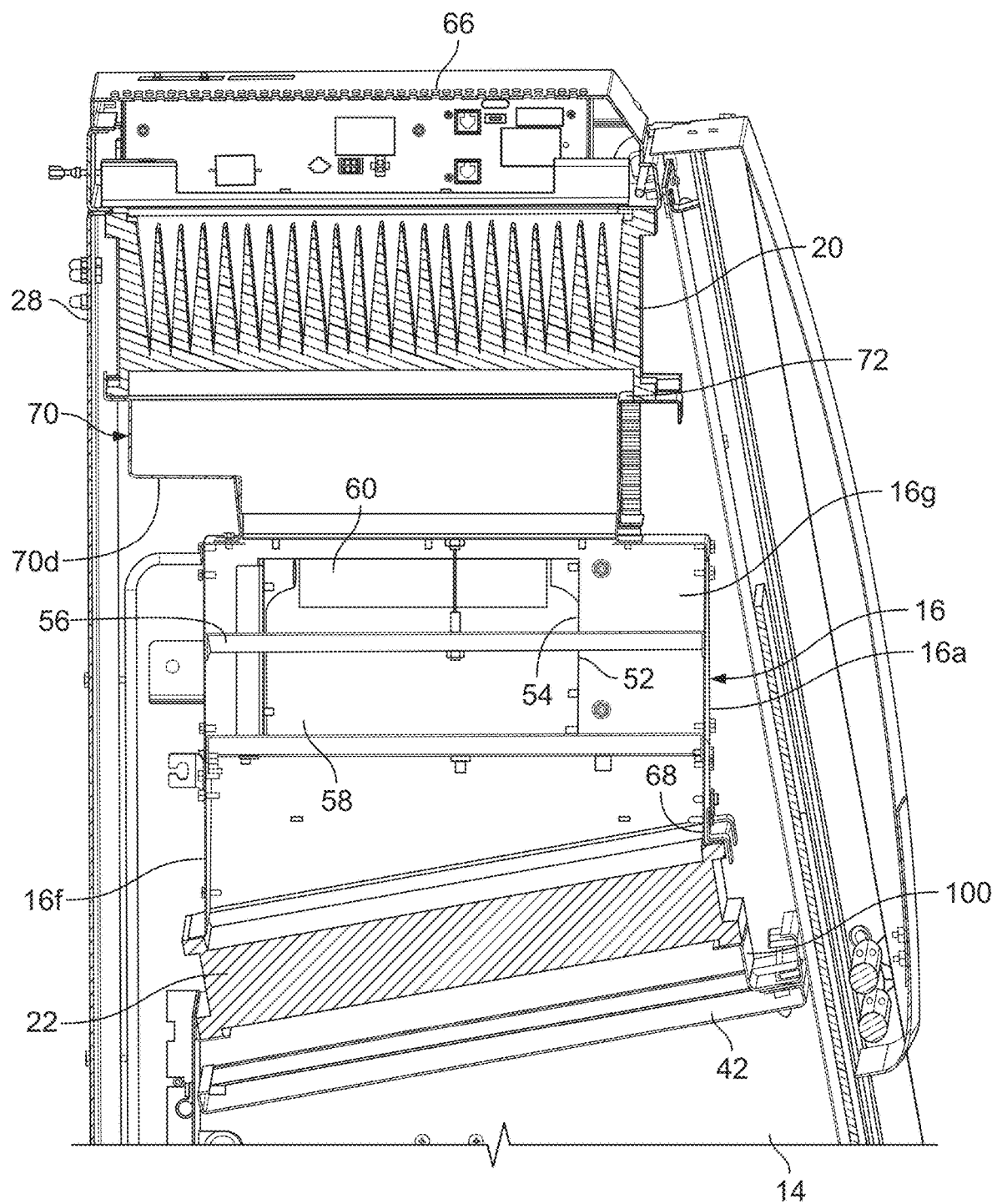
FIG. 7 is a cross-sectional view of the upper portion of the biosafety cabinet taken through the line 7-7 in FIG. 2.

Referring to FIG. 4, the plenum 16 includes a front wall 16a, an upper wall 16b, a first side wall 16c, a second side wall 16d, a first intermediate wall 16e, a rear wall 16f (FIG. 7), and a second intermediate wall 16g. The walls 16a-g of the plenum 16 are shown as being joined together with fasteners, and may be joined together in any suitable manner. Further, any of the walls 16a-g may be integrally formed together (e.g., the upper wall 16b and first side wall 16c may be formed from the same sheet of material, and the second side wall 16d and intermediate walls 16e and 16g may be formed from the same sheet of material). The front and rear walls 16a and 16f are generally parallel and are each joined to the upper wall 16b, side walls 16c-d and intermediate walls 16e and 16g. The side wall 16c is joined to the front wall 16a, upper wall 16b, and rear wall 16f. The side wall 16d is generally parallel to the side wall 16c and is joined to the front wall 16a, intermediate wall 16e, and rear wall 16f. The first intermediate wall 16e is generally parallel to the upper wall 16b. The first intermediate wall 16e extends from an upper edge of the side wall 16d toward the side wall 16c. The second intermediate wall 16g is generally parallel to the side walls 16c-d. The second intermediate wall 16g is joined to and extends between the first intermediate wall 16e and the upper wall 16b. As shown in FIG. 7, the inlet 54 of the plenum 16 is formed in the second intermediate wall 16g. Lower edges of the front wall 16a, side walls 16c-d, and rear wall 16f define a supply opening 68 (FIG. 7) of the plenum 16.

The plenum 16 further includes an exhaust filter mount 70 (FIGS. 4, 6, and 7) that is mounted to and extends upward from the upper wall 16b. The exhaust filter mount 70 includes a front wall 70a, side walls 70b-c, and a rear wall 70d (FIG. 7) that are joined together. The front wall 70a and side walls 70b-c are generally planar, and the rear wall 70d includes a first section extending upward from the upper wall 16b, a second section extending rearward toward the rear panel 28 of the housing 12, and a third section extending upward toward the exhaust filter 20. Upper edges of the walls 70a-d define an exhaust opening 72 (FIG. 7) of the plenum 16.

Figure 8:
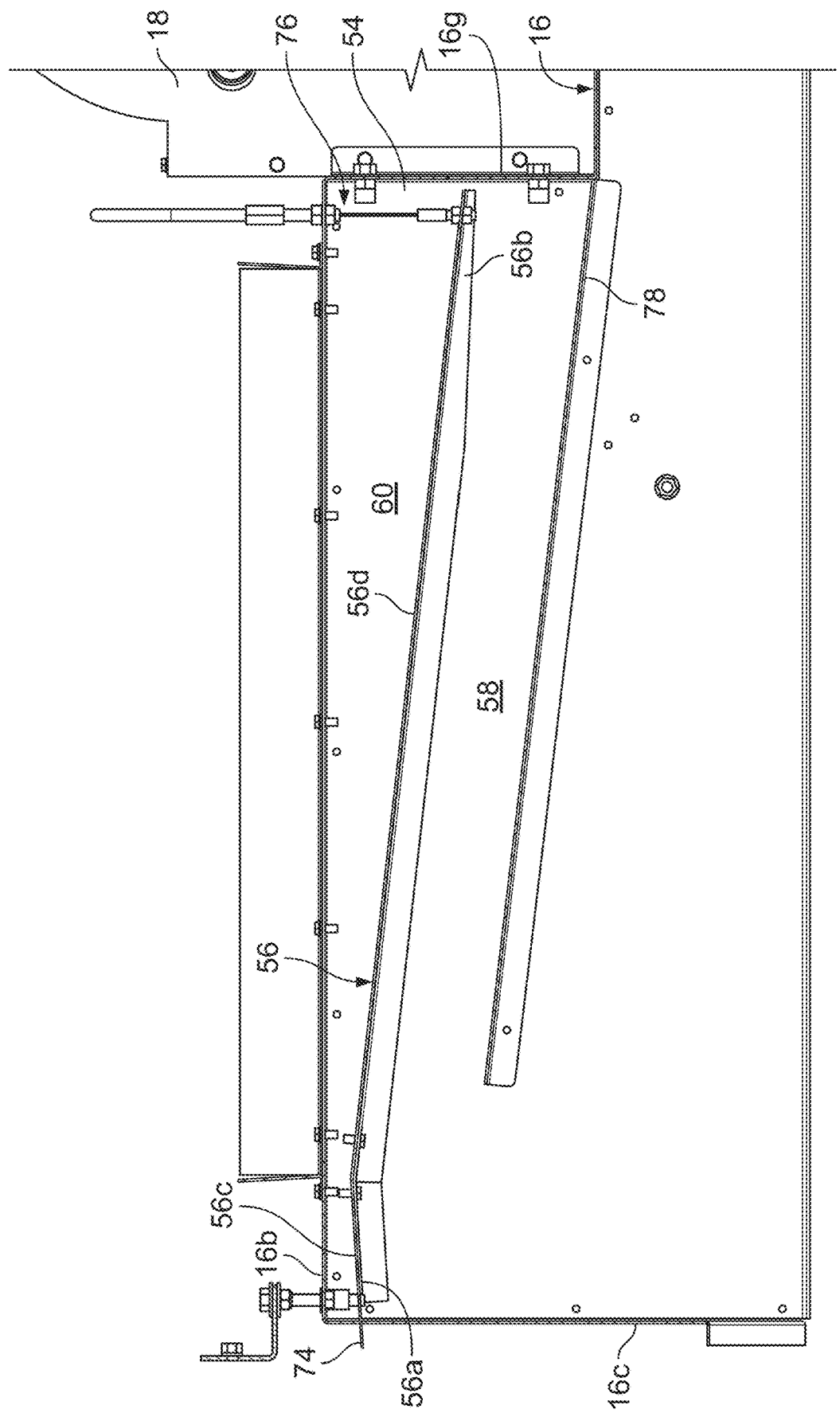
FIG. 8 is a cross-sectional view of the plenum of the biosafety cabinet shown in FIG. 1.

Referring now to FIG. 8, the divider 56 extends lengthwise across the plenum 16 from the side wall 16c to the inlet 54 formed in the intermediate wall 16g. Slots (not shown) formed in the side wall 16c receive tabs, one of which is identified as 74 in FIG. 8, to pivotably mount the divider 56 to the plenum 16. The tabs 74 are mounted to the plenum 16 adjacent an upper edge of the side wall 16c. The divider 56 has a first end 56a positioned at the end of the plenum 16 adjacent side wall 16c and a second end 56b positioned adjacent the blower 18 and inlet 54. As shown in FIG. 7, the divider 56 extends widthwise across the plenum 16 from the front wall 16a to the rear wall 16f. The divider 56 extends lengthwise and widthwise across the plenum 16 to separate the supply section 58 of the plenum 16 from the exhaust section 60 and substantially inhibit the movement of air from the supply section 58 to the exhaust section 60 and vice versa.

As shown in FIG. 8, the divider 56 includes a first section 56c that is mounted to the side wall 16c, and a second section 56d that extends downward at an angle from the first section 56c to the inlet 54. The second end 56b of the divider 56 is vertically adjustable within the plenum 16 via an adjuster 76 that is joined to the second end 56b. As the second end 56b moves vertically, the tabs 74 pivot within the slots of the side wall 16c. Instead of being pivotably mounted to the plenum 16 with tabs 74, the divider 56 may be pivotably mounted to the plenum 16 in any suitable manner. For example, the divider 56 may be pivotably mounted to the plenum 16 with a hinge, pins extending outward from sides of the divider 56 that are received by holes in the front wall 16a and rear wall 16f, or pins extending from the front wall 16a and the rear wall 16f that are received by holes in sides of the divider 56.

A guide 78 is also positioned in the plenum 16 beneath the divider 56. The guide 78 is generally planar and extends from the bottom of the inlet 54 at an upward angle toward the side wall 16c. The guide 78 also extends between the front wall 16a and the rear wall 16f. The blower 18 is mounted to the wall 16g and oriented to blow air in the plenum 16 in a direction toward and generally perpendicular to the side wall 16c. The guide 78 assists in redirecting air from the blower 18 that enters the supply section 58 so that the air is generally distributed across the length of the plenum 16 from the side wall 16c to the side wall 16d (FIG. 4).

Figure 9:
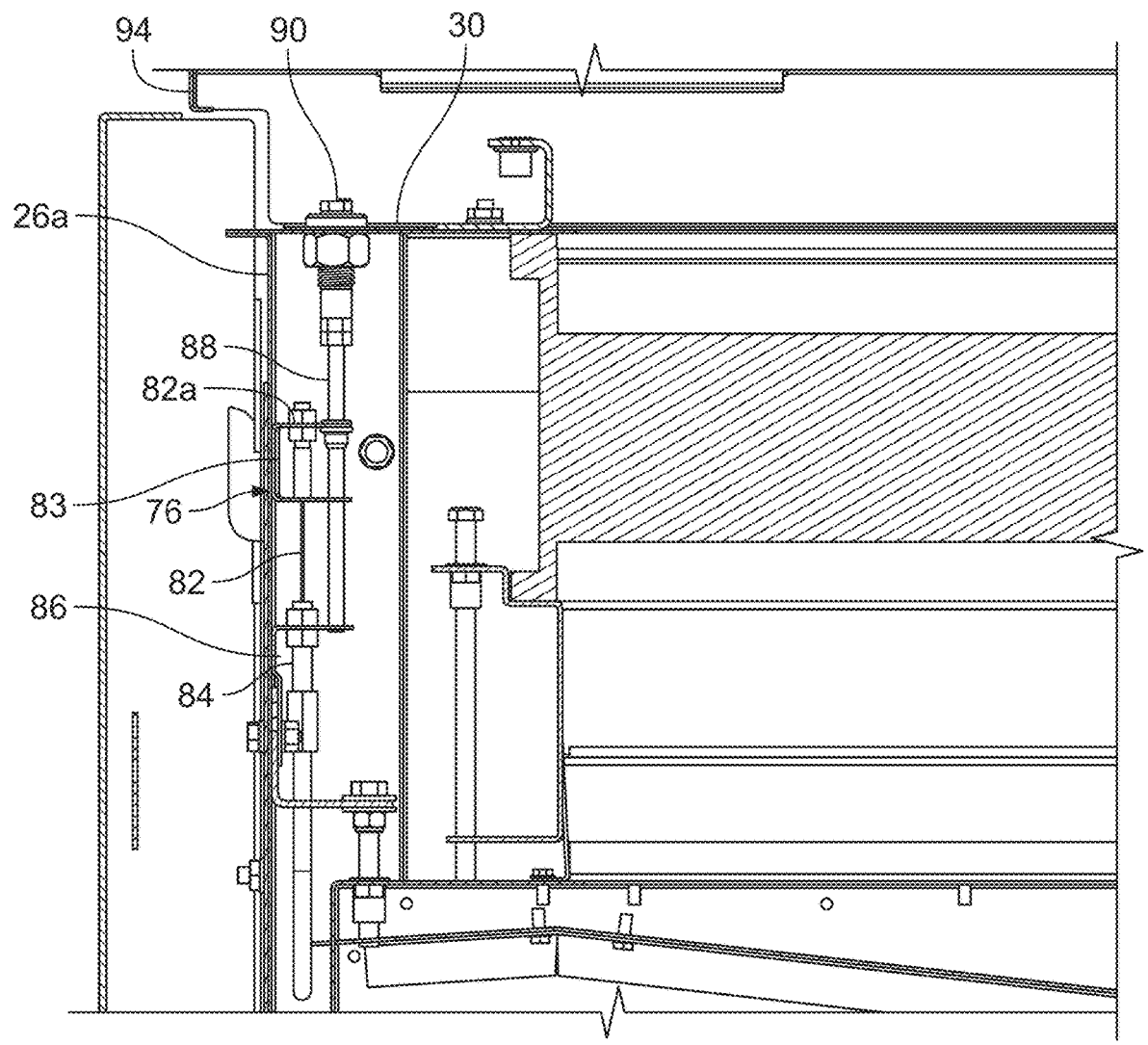
FIG. 9 is a detail view of the area identified as "FIG. 9" in FIG. 5 showing a portion of an adjuster that is operable to adjust the position of a divider in the plenum of the biosafety cabinet.
Figure 10:
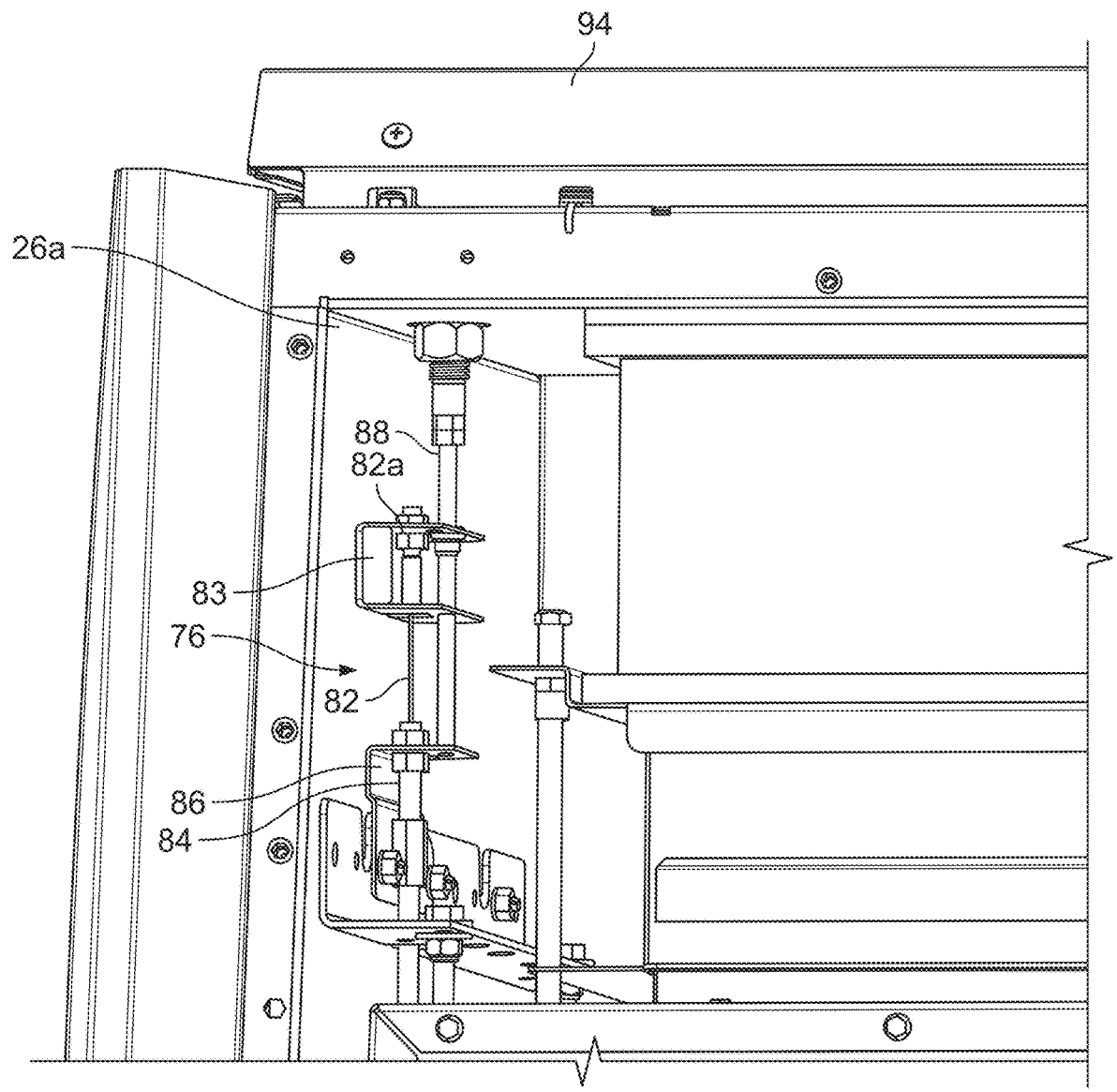
FIG. 10 is a perspective view of the area shown in FIG. 9.
Figure 11:
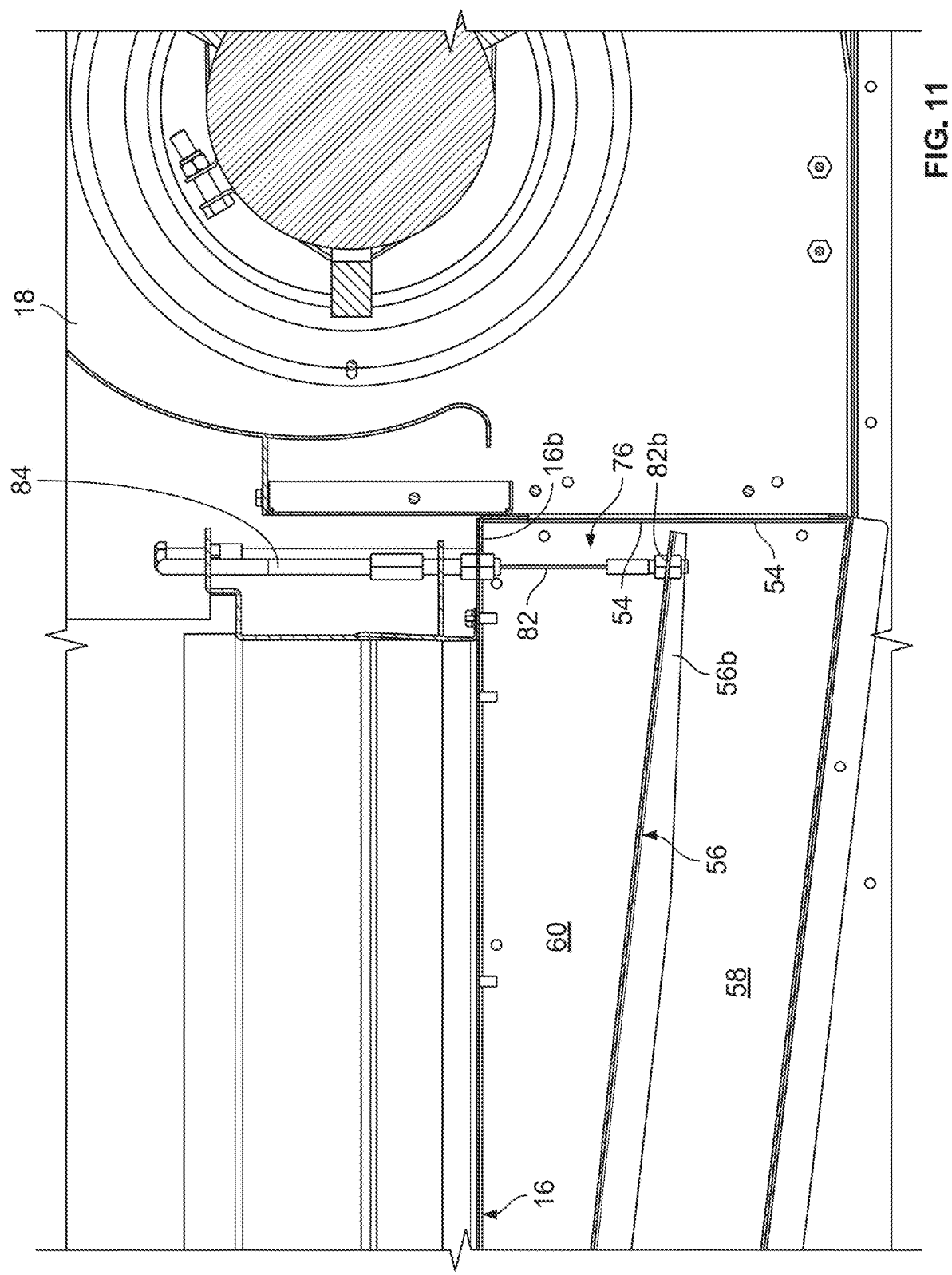
FIG. 11 is a detail view of the area identified as "FIG. 11" in FIG. 5 showing another portion of the adjuster.

The adjuster 76 is described herein with reference to FIGS. 9-11. The adjuster 76 includes a cable 82 with a first end 82a, shown in FIGS. 9 and 10, that is mounted to a bracket 83 and a second end 82b, shown in FIG. 11, that is mounted to the second end 56b of the divider 56. The cable 82 is received within a housing 84 that extends between the first and second ends 82a-b of the cable 82. The cable 82 and housing 84 may be, for example, a typical push-pull cable and housing. Near the first end 82a of the cable 82, the housing 84 is mounted to a bracket 86 that is mounted to the side panel 26a of the housing 12. Near the second end 82b of the cable 82, the housing 84 is mounted to the upper wall 16b of the plenum 16. The bracket 83 (FIGS. 9 and 10) is not fixedly mounted to the housing 12 of the biosafety cabinet 10. Instead, the bracket 83, and first end 82a of the cable 82, are movable vertically with respect to the housing 12. A threaded rod 88 engages a threaded surface (not shown) of the bracket 83. A head 90 (FIG. 9) of the threaded rod 88 is positioned above the top panel 30. The head 90 is accessible by removing an access panel 92 (FIG. 2) mounted to an upper cover 94 of the housing 12.

Figure 2:
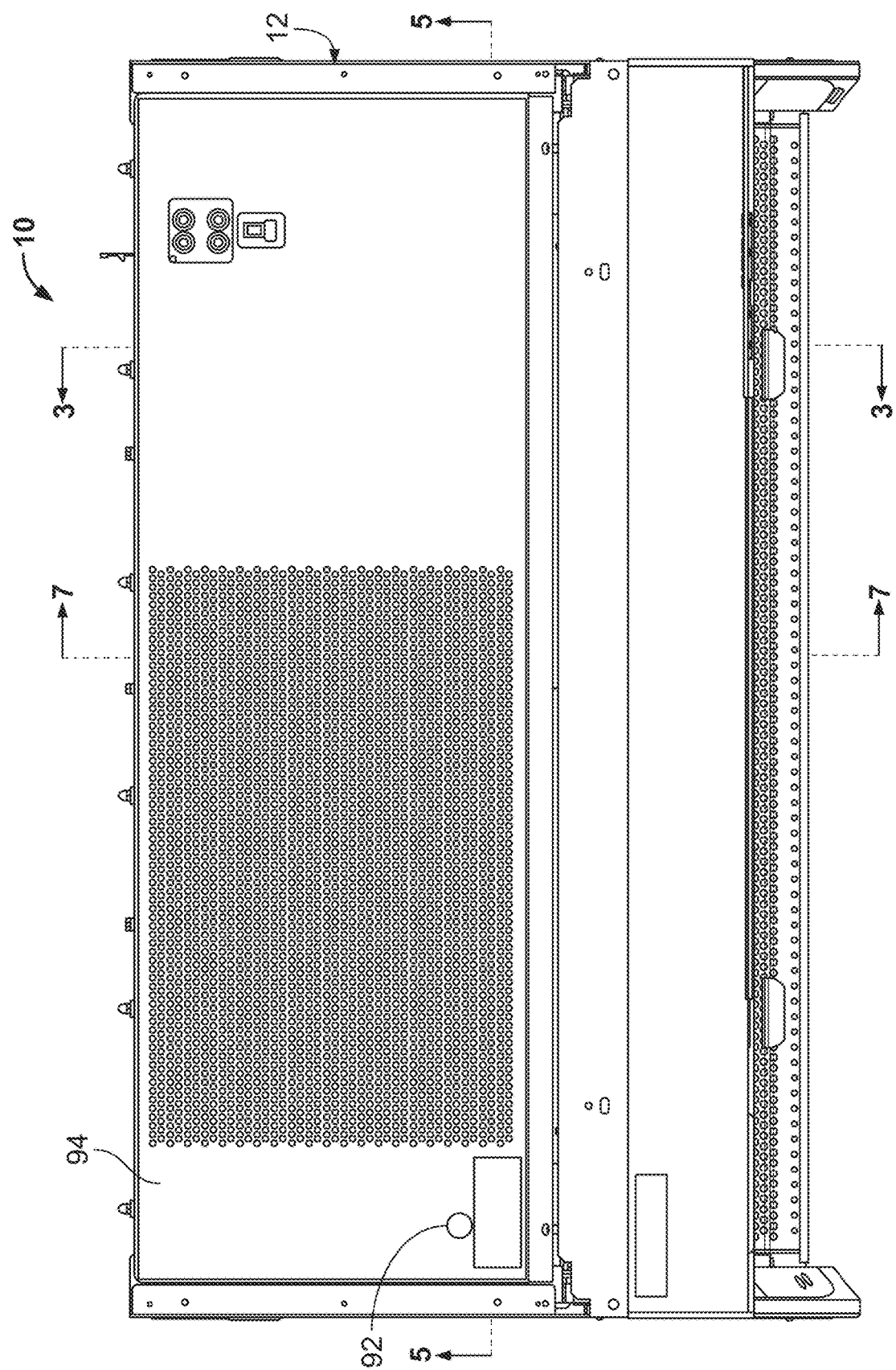
FIG. 2 is a top plan view of the biosafety cabinet shown in FIG. 1.

Rotation of the threaded rod 88 in a first direction (e.g., a clockwise direction when viewing the top of the housing 12 as shown in FIG. 2) moves the bracket 83 vertically upward thereby pulling the first end 82a of the cable 82 upward. As the cable 82 is pulled by the bracket 83, the second end 82b (FIG. 11) of the cable 82 pulls the second end 56b of the divider 56 vertically upward, which causes the divider 56 to rotate upward about its pivotal mounting to the side wall 16c (FIG. 8). Movement of the divider 56 in this direction increases the volume of the supply section 58 of the plenum 16 and reduces the volume of the exhaust section 60 of the plenum 16. Further, movement of the second end 56b of the divider 56 upward increases the cross-sectional area of the supply section 58 at the inlet 54 of the plenum 16 and decreases the cross-sectional area of the exhaust section 60 at the inlet 54 of the plenum 16. Increasing the cross-sectional area of the supply section 58 at the inlet 54 increases a flow rate of the air supplied to the supply section 58 by the blower 18, and decreasing the cross-sectional area of the exhaust section 60 at the inlet 54 decreases a flow rate of the air supplied to the exhaust section 60 by the blower 18.

Figure 12:
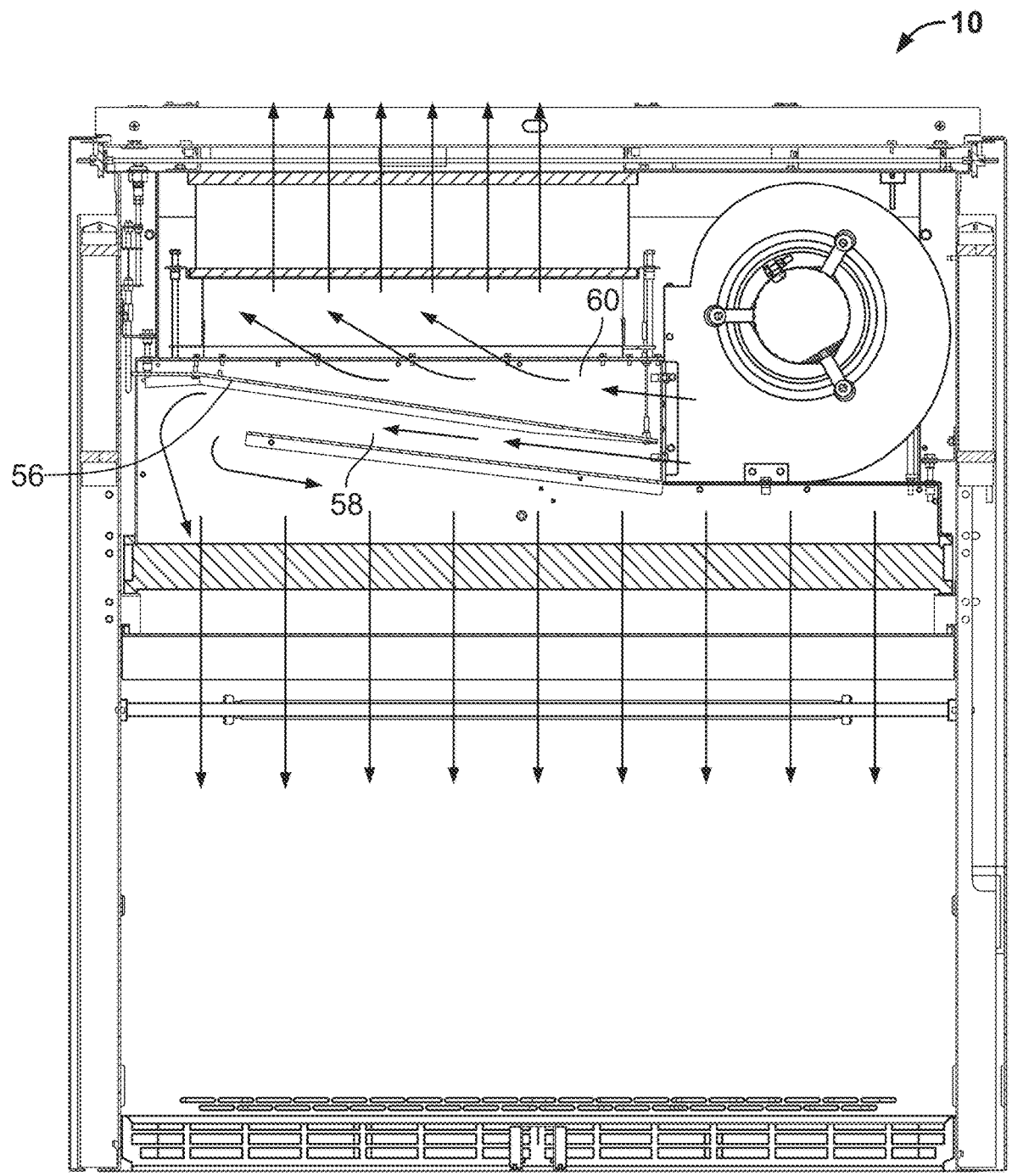
FIG. 12 is a cross-sectional view similar to FIG. 5 but showing the divider of the biosafety cabinet moved downward from the position shown in FIG. 5 to enlarge an exhaust section of the plenum and reduce a supply section of the plenum.

Rotation of the threaded rod 88 in a second direction (e.g., a counter-clockwise direction when viewing the top of the housing 12 as shown in FIG. 2) moves the bracket 83 vertically downward thereby pushing the first end 82a of the cable 82 downward. As the cable 82 is pushed by the bracket 83, the second end 82b (FIG. 11) of the cable 82 pushes the second end 56b of the divider 56 vertically downward, which causes the divider 56 to rotate downward about its pivotal mounting to the side wall 16c (FIG. 8). For example, FIG. 12 shows the divider 56 rotated downward relative to the position of the divider 56 shown in FIGS. 5, 8, and 11. Movement of the divider 56 in this direction reduces the volume of the supply section 58 of the plenum 16 and increases the volume of the exhaust section 60 of the plenum 16. Further, movement of the second end 56b of the divider 56 downward decreases the cross-sectional area of the supply section 58 at the inlet 54 of the plenum 16 and increases the cross-sectional area of the exhaust section 60 at the inlet 54 of the plenum 16. Decreasing the cross-sectional area of the supply section 58 at the inlet 54 decreases a flow rate of the air supplied to the supply section 58 by the blower 18, and increasing the cross-sectional area of the exhaust section 60 at the inlet 54 increases a flow rate of the air supplied to the exhaust section 60 by the blower 18.

Referring back to FIG. 5, the exhaust filter 20 is positioned in the airflow path between the exhaust section 60 of the plenum 16 and the exhaust outlet 66 of the housing 12. The exhaust filter 20 is supported by the exhaust filter mount 70 and positioned between the mount 70 and the top panel 30. The air that is supplied to the exhaust section 60 of the plenum 16 from the blower 18 passes through the exhaust filter 20 to remove contaminants from the air before the air passes through the exhaust outlet 66. The blower 18, plenum 16, and divider 56 are configured so that the air supplied to the exhaust section 60 from the blower 18 passes through the exhaust filter 20 without entering the supply section 58. The exhaust filter 20 has an inlet surface 20a that is exposed to the exhaust section 60 of the plenum 16. The exhaust section 60 of the plenum 16 is configured so that there is an unrestricted airflow path in the exhaust section 60 from the blower 18 to the inlet surface 20a of the exhaust filter 20. "Unrestricted" as used herein means that the airflow path from the location where air from the blower 18 enters the exhaust section 60 of the plenum 16 to the inlet surface 20a of the exhaust filter 20 is not reduced in cross-sectional area more than five percent (5%) at any point (i.e., at any location along the airflow path from the blower 18 through the exhaust section 60 to the inlet surface 20a, the cross-sectional area of the airflow path is not reduced more than five percent (5%) from the cross-sectional area of the airflow path at any other location along the path that is nearer to the blower 18).

As shown in FIG. 5, the supply filter 22 is positioned in the airflow path between the supply section 58 and the work area 14. The supply filter 22 is supported on a supply filter mount 100 (FIGS. 5 and 7) that extends between the side panels 26a-b. The supply filter 22 is positioned between the mount 100 and the lower edge of the plenum 16. The air that is supplied to the supply section 58 from the blower 18 passes through the supply filter 22 to remove contaminants from the air before the air enters the work area 14. The blower 18, plenum 16, and divider 56 are configured so that the air supplied to the supply section 58 from the blower 18 passes through the supply filter 22 without entering the exhaust section 60.

Figure 13:
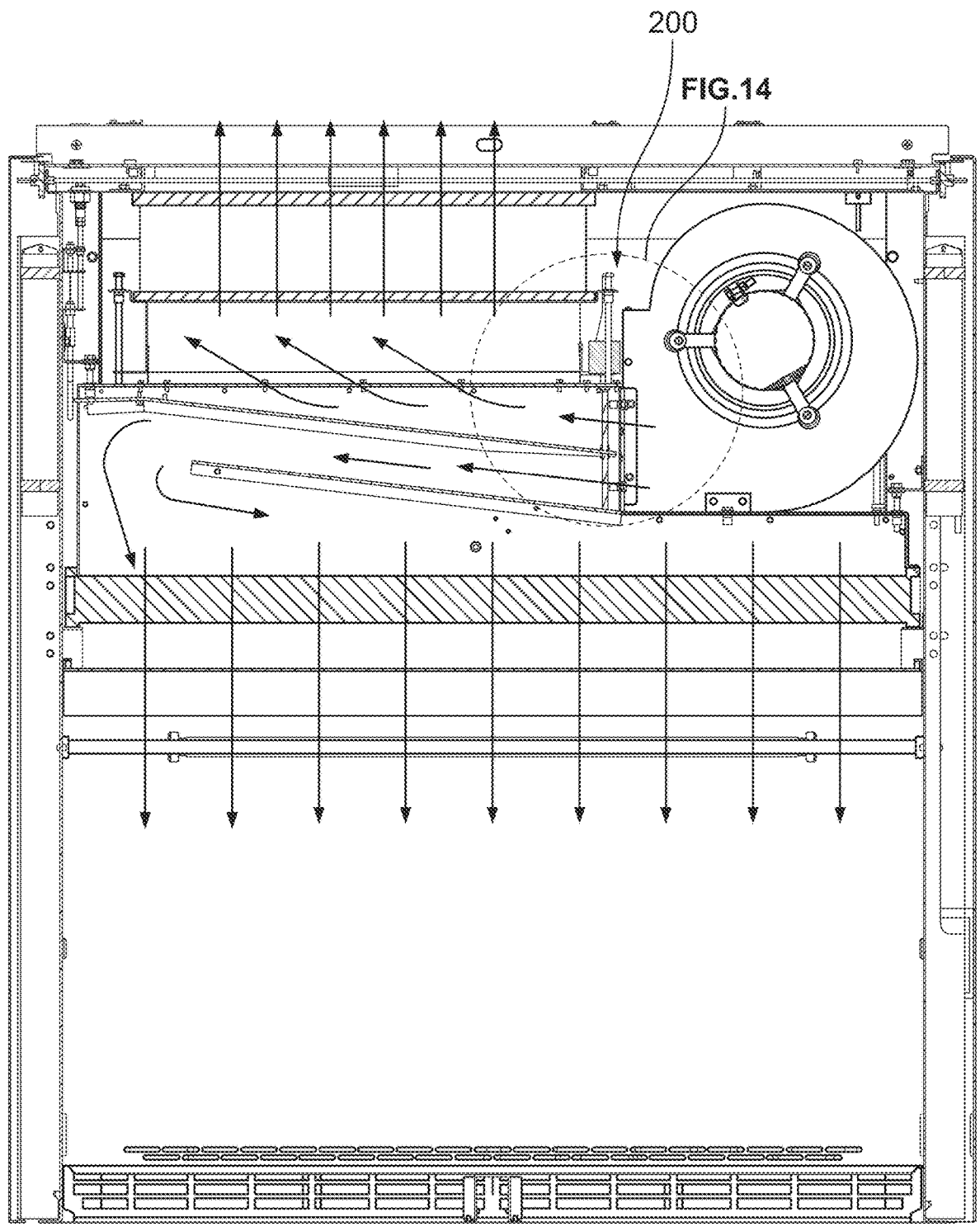
FIG. 13 is a cross-sectional view similar to FIG. 5 but showing an alternative embodiment of adjuster that is operable to adjust the position of the divider in the plenum.
Figure 14:
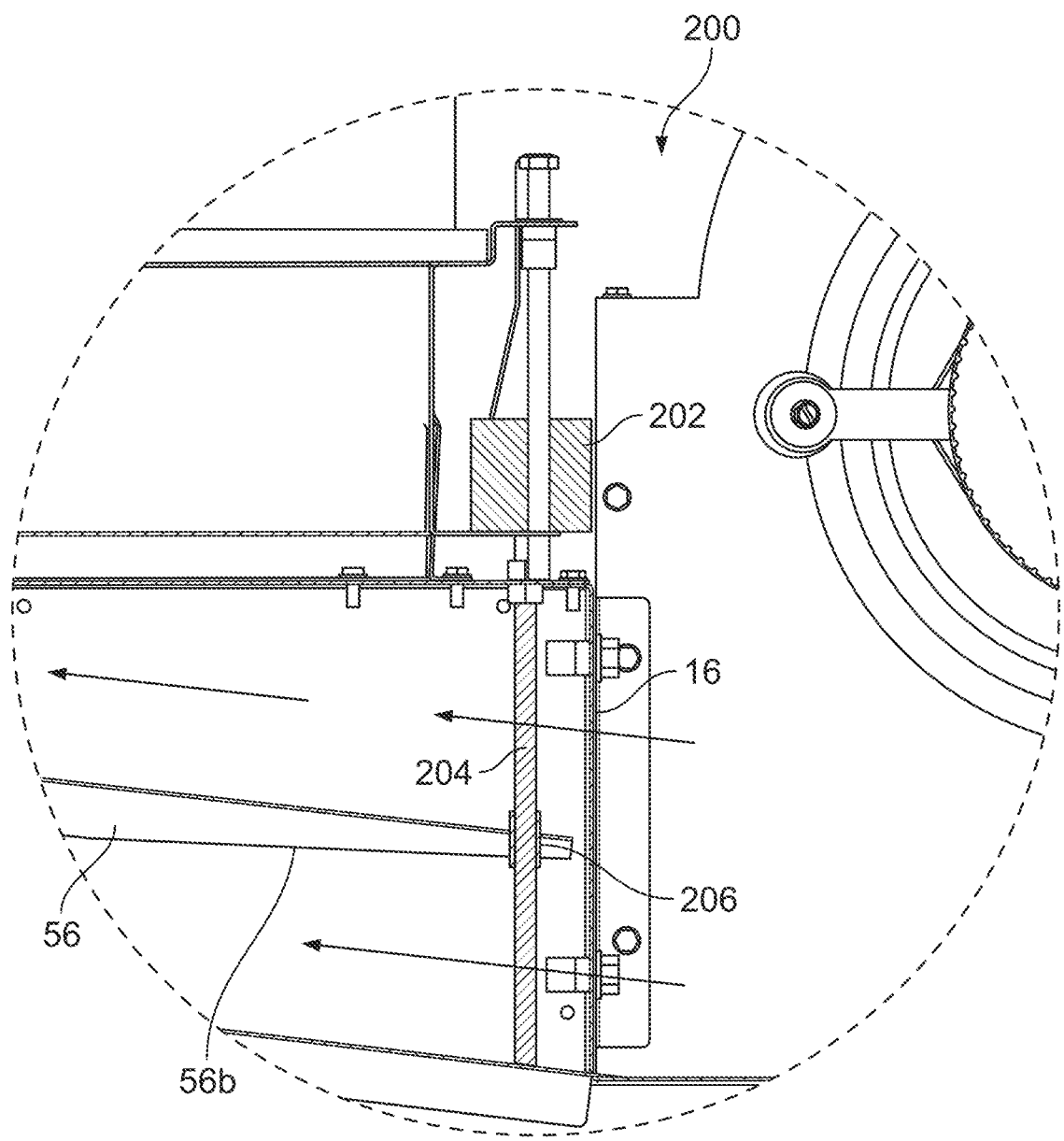
FIG. 14 is a detail view of the area identified as "FIG. 14" in FIG. 13.

FIGS. 13 and 14 show an alternative adjuster 200 that may be used with the biosafety cabinet 10 in place of the adjuster 76 described above and shown in FIGS. 9-11. As shown in FIG. 14, the adjuster 200 includes a motor 202 that is mounted to the plenum 16 above the divider 56. The motor 202 is operable to rotate a threaded rod 204 that engages a threaded opening 206 in the second end 56b of the divider 56. Rotation of the threaded rod 204 in one direction causes the second end 56b of the divider 56 to move vertically upward, and rotation of the threaded rod 204 in the opposite direction causes the second end 56b of the divider 56 to move vertically downward. In addition to the adjusters 76 and 200 disclosed herein, any other suitable electromechanical or non-electromechanical adjustment mechanism may be used to move the second end 56*b* of the divider 56 vertically upward and downward to adjust the position of the divider 56 within the plenum 16.

In use and as shown in FIG. 3, blower 18 is operated to provide downward airflow through the biosafety cabinet 10, and particularly through work area 14. Prior to entering the work area 14, the air first passes through the supply filter 22, preferably a HEPA filter, to remove contaminants. Biosafety cabinet 10 may be operated with sash 40 located a specified distance away from sash grill 38. To ensure that contaminants from the work area 14 do not escape through the opening between sash 40 and sash grill 38, blower 18 directs air downwardly along the rear surface of sash 40 and into the openings 38*a* of grill 38 from above the work area 14 to provide a protective curtain of air that facilitates containment within work area 14. A portion of the air from blower 18 also moves toward the rear of work surface 36 and enters the recirculation duct 50 through the openings 34*a* in the lower portion of the baffle 34. The air exhausted out of the exhaust outlet 66 (through the exhaust filter 20) is replaced by the inflow of ambient air from outside the biosafety cabinet 10 flowing inwardly through the front opening 41. The air drawn through the front opening 41 passes through the openings 38*a* in sash grill 38. The air drawn through front sash grill 38 travels through the recirculation duct 50 beneath work surface 36 and between the baffle 34 and rear panel 28 as it is drawn upwardly by blower 18. The air in the recirculation duct 50 enters the blower 18, which recirculates a portion of the air through the supply filter 22 and exhausts a portion of the air through the exhaust filter 20.

As described above, the single blower 18 supplies both the supply air 64 (FIG. 5) and exhaust air 62 to the plenum 16 with the divider 56 dividing the air output from the blower 18 into the supply air 64 and the exhaust air 62. The position of the divider 56 is adjusted to ensure that the balance between the airflow rates of the supply air 64 and the exhaust air 62 is appropriate to ensure safe operation of the biosafety cabinet 10. For example, the airflow rate of the exhaust air 62 needs to be at a level that creates a negative pressure within the work area 14 to draw ambient air into the front opening 41 (FIG. 1) and sash grill 38 of the biosafety cabinet at a rate that prevents contaminants in the work area 14 from exiting the biosafety cabinet 10 through the front opening 41. Further, the airflow rate of the supply air 64 passing through the supply filter 22 needs to be at a sufficient level to provide a downward laminar flow of air through the work area 14 that provides sterile (HEPA-filtered) air to protect products or materials being worked on in the work area 14.

The blower 18 operates at a speed necessary to ensure that the airflow rate of the supply air 64 passing through the supply filter 22 and the airflow rate of the exhaust air 62 passing through the exhaust filter 20 are sufficient to ensure safe operation of the biosafety cabinet 10 as described above. The flow rates of the air passing through the supply filter 22 and exhaust filter 20 depend on the speed of the blower 18 and the resistance of the filters to air flowing therethrough. As the filter 20 becomes loaded with contaminants, the resistance of the filter increases. The biosafety cabinet 10 and blower 18 may be configured to sense the increased resistance over time and automatically increase the speed of the blower 18 to compensate for the increased filter resistance thereby ensuring that the airflow rates through the filters 20 and 22 are at a level to ensure safe operation of the biosafety cabinet 10. For example, the blower 18 may be a commercially available energy efficient blower having a motor with electronic intelligence capable of maintaining a constant airflow rate into the plenum 16. The blower 18 may have a programmable, variable speed motor configured to maintain a substantially constant airflow rate through the exhaust filter 20 and the supply filter 22. To maintain a substantially constant airflow rate, the blower 18 may be programmed so that the blower motor increases the speed of the blower wheel to compensate for any increased resistance to airflow attributable to contaminants accumulating within the exhaust and supply filters 20 and 22. The blower 18 may include an electronically commutated motor (ECM), although other motors could also be used in the biosafety cabinet 10. The blower motor may be programmed to follow a torque and speed curve to supply air at a constant airflow rate to the plenum 16 despite loading of the exhaust and supply filters 20 and 22.

The divider 56 may be adjusted to balance the airflow rates through the filters 20 and 22 to ensure that the airflow rates are sufficient for safe operation of the biosafety cabinet 10. For example, if the airflow rate through the supply filter 22 is too low relative to the airflow rate through the exhaust filter 20, the divider 56 may be adjusted upward to cause more air from the blower 18 to flow into the supply section 58 of the plenum 16. If the airflow rate through the exhaust filter 20 is too low relative to the airflow rate through the supply filter 22, the divider 56 may be adjusted downward to cause more air from the blower 18 to flow into the exhaust section 60 of the plenum 16. Adjustment of the divider 56 may be necessary to ensure sufficient airflow rates through the filters 20 and 22 due to differences in the rates of loading of the filters 20 and 22 over time. For example, if the resistance to airflow of one of the filters 20 or 22 increases at a greater rate than the other of the filters 20 or 22 due to loading of the filters by contaminants, the ratio of the airflow rates through the filters will gradually change over time. The filter 20 or 22 with a higher rate of resistance increase will allow a lower amount of airflow through the filter relative to the filter with a lesser rate of resistance increase. The divider 56 may be adjusted to compensate for the difference in the rate of filter resistance increase between the filters 20 and 22. For example, the divider 56 may be moved to increase the volume of the supply section 58 if the resistance of the supply filter 22 increases at a greater rate than the resistance of the exhaust filter 20, and the divider 56 may be moved to increase the volume of the exhaust section 60 if the resistance of the exhaust filter 20 increases at a greater rate than that of the supply filter 22.

The biosafety cabinet 10 may be classified as a Class II, Type A2 biosafety cabinet suitable for personnel, product, and environmental protection when work is performed in the biosafety cabinet such as microbiological work or sterile pharmacy compounding. The negative pressure in the work area 14 causing air to flow inwardly through the front opening 41 provides personnel protection by not allowing contaminants to exit through the front opening 41. The downward laminar airflow from the supply filter 22 through the work area 14 provides product protection by covering the work area with sterile (HEPA filtered) air and subsequently the products being worked on in the biosafety cabinet. The exhaust filter 20 provides environmental protection by filtering contaminants from the air before that air is exhausted from the biosafety cabinet.

The biosafety cabinet 10 may have the following advantages relative to a conventional Class II, Type A2 biosafety cabinet that has a single blower, which supplies air to a single plenum in fluid communication with both a supply filter and an exhaust filter. First, the biosafety cabinet 10 is adjustable via the divider 56 to change the relative airflow rates through the exhaust filter and the supply filter independently of the variation between the resistances of the supply filter and the exhaust filter. With a conventional biosafety cabinet having a single plenum, the airflow rate through each filter depends at least in part on the variation between the resistances of the supply filter and the exhaust filter due to air flowing more easily through the filter with a lower resistance. While the filters may be selected initially to ensure proper airflow through the filters, if the filters are loaded at different rates over time, it may not be possible to balance the airflow rate through the filters to achieve safe operating conditions. Further, while conventional biosafety cabinets may have a sliding damper operable to adjustably restrict the area of the exhaust filter that is exposed to the single plenum, the airflow rate through the filters is still dependent on the resistance variation between the filters.

The biosafety cabinet 10 may also be operated in a more efficient manner than a conventional Class II, Type A2 biosafety cabinet. As described above, the biosafety cabinet 10 is designed with an unrestricted airflow path in the exhaust section 60 from the blower 18 to the inlet surface 20a of the exhaust filter 20. With an unrestricted airflow path, the blower 18 may be operated at a lower speed to achieve a desired airflow rate through the exhaust filter 20 than if the airflow path was restricted. In contrast to biosafety cabinet 10, many conventional biosafety cabinets have a sliding damper or other restriction means to restrict the area of the exhaust filter that is exposed to the plenum. The restriction causes a higher resistance to airflow through the filter necessitating a higher blower speed to achieve a desired airflow rate through the exhaust filter. Operating the blower at a higher speed means that more power is needed to operate the blower, and the blower generates more noise. Thus, by having an unrestricted airflow path from the blower 18 to the inlet surface 20a of the exhaust filter 20, the biosafety cabinet 10 may operate more efficiently by consuming less power to achieve a desired airflow rate through the exhaust filter 20 than a conventional biosafety cabinet. The biosafety cabinet 10 may also generate less noise during operation.

Further, the biosafety cabinet 10 may be operated in a more efficient manner than a conventional Class II, Type A2 biosafety cabinet because the plenum 16 is divided into a supply section 58 and an exhaust section 60 that are each simultaneously pressurized by the blower 18. This is in contrast to a conventional biosafety cabinet having a single plenum pressurized by a blower. With a conventional biosafety cabinet the blower speed needs to be set a level that will pressurize the air within the entire plenum higher than the greatest resistance to airflow or pressure drop of either the supply filter or the exhaust filter so that air will flow through the filter with the highest resistance. Typically, the supply filter is selected with a higher pressure drop than the exhaust filter so that the airflow through the exhaust filter is at a sufficient rate for safe operation. With the biosafety cabinet 10 described herein, the speed of the blower 18 can be set at a level, and the divider 56 adjusted, so that the air within each of the supply section 58 and the exhaust section 60 is at a pressure just above the resistance or pressure drop of the supply filter 22 and exhaust filter 20, respectively. Because the entire plenum 16 of the biosafety cabinet 10 does not need to be pressurized above the filter having the highest resistance, the blower 18 can be operated at a lower speed than the blower of a traditional biosafety cabinet. As described above, operation of the blower 18 at a lower speed is more efficient due to less power consumption by the blower and also generates less noise.

Additionally, the design of the biosafety cabinet 10 allows the supply filter 22 and exhaust filter 20 to be selected independently of each other without reference to the resistance or pressure drop of the other filter. As described above, with a conventional biosafety cabinet, the blower needs to be set at a speed that will pressurize the plenum above the highest resistance of the two filters. Further, the supply filter is typically selected with a higher pressure drop than the exhaust filter to ensure sufficient airflow through the exhaust filter. Because the supply filter 22 and exhaust filter 20 of the biosafety cabinet 10 can be selected independently of each other, each of the filters may be selected to have the lowest pressure drop possible taking into account other specifications that the filters need to meet for safe operation. This allows a wider tolerance of the pressure drop for each filter, and eliminates the need to "match" a supply filter with an exhaust filter based on their pressure drop. Both of these advantages reduce manufacturing cost.

In addition to consuming less power and generating less noise, operating the blower 18 at a lower initial speed when the filters are new allows a user of the biosafety cabinet 10 to use the supply filter 22 and exhaust filter 20 for a longer length of time. As the filters are loaded over time, the blower 18 gradually increases in speed to overcome the increased resistance or pressure drop caused by the filter loading. When the blower 18 reaches its maximum speed and is no longer able to force air through the loaded filters at an airflow rate necessary for safe operation of the biosafety cabinet 10, the filters must be replaced. Since the blower 18 can be operated at a lower speed than the blower of a traditional biosafety cabinet for the reasons set forth above (i.e., unrestricted airflow path to the exhaust filter, ability to select pressure drop of the exhaust and supply filters independently of each other, and pressurization of each of the supply section and exhaust sections of the plenum just above the pressure drop of the supply filter and exhaust filter, respectively), the filters can be loaded for a longer time period until the blower 18 reaches its maximum speed. This reduces cost of ownership to the user.

The biosafety cabinet 10 may also be more efficient than a conventional biosafety cabinet having two blowers, one to direct air through the supply filter and another to direct air through the exhaust filter, because it takes more power to operate two blower motors than a single blower motor.

The biosafety cabinet 10 may be designed and operated in accordance with the following parameters. The blower 18 may operate with an airflow rate of between 500 to 1200 cubic feet per minute (CFM). All or substantially all of the air from the blower 18 enters the plenum 16. The airflow rate into the exhaust section 60 of the plenum 16 may be between 260 to 630 CFM. The remainder of the airflow from the blower 18 enters the supply section 58 of the plenum 16. The specific airflow rate of the blower 18 and the airflow into the different sections of the plenum 16 may depend on the width of the biosafety cabinet 10 and the height of the front opening 41 defined by the position of the sash 40. The width of the biosafety cabinet 10 may be, for example, three, four, five, or six feet, and the height of the front opening 41 may be, for example, eight, ten, or twelve inches. The blower 18 may have a motor that draws an electric current of between two to six amps. The current draw of the motor may depend on the width of the biosafety cabinet, the height of the front opening 41, the voltage of the power source (e.g., 120 or 240 volts), and the loading of the filters.

When the blower 18 is operating, the air within the plenum 16 may be positively pressurized to between 0.3 to 1 inches of water. The resistance to airflow or pressure drop of the exhaust filter 20 may be between 0.20 to 0.55 inches of water, and the pressure drop of the supply filter 22 may be between 0.35 to 0.70 inches of water. Both the exhaust and supply filters 20 and 22 may be HEPA or ULPA filters.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

The invention claimed is:

1. A biosafety cabinet comprising:
 a plenum;
 a divider positioned in the plenum, the divider dividing the plenum into a supply section and an exhaust section;
 a blower positioned in fluid communication with the plenum, the blower configured to simultaneously supply air to both the supply section and the exhaust section of the plenum;
 an adjuster coupled to the divider, the adjuster configured to adjust a position of the divider in the plenum, wherein adjustment of the divider in a first direction increases a volume of the supply section, and wherein adjustment of the divider in a second direction increases a volume of the exhaust section;
 an exhaust filter positioned between the exhaust section and an exhaust outlet, wherein the air supplied to the exhaust section from the blower passes through the exhaust filter; and
 a supply filter positioned between the supply section and a work area, wherein the air supplied to the supply section from the blower passes through the supply filter.

2. The biosafety cabinet of claim 1, further comprising:
 a housing defining the work area and a front access opening through which the work area is accessible; and
 a recirculation duct in fluid communication with the work area and an inlet of the blower.

3. The biosafety cabinet of claim 1, wherein the divider and the blower are configured so that the air supplied to the supply section from the blower passes through the supply filter without entering the exhaust section, and the air supplied to the exhaust section from the blower passes through the exhaust filter without entering the supply section.

4. The biosafety cabinet of claim 1, wherein the exhaust filter comprises an inlet surface exposed to the exhaust section of the plenum, and wherein the exhaust section of the plenum is configured so that there is an unrestricted airflow path in the exhaust section from the blower to the inlet surface of the exhaust filter.

5. The biosafety cabinet of claim 1, wherein adjustment of the divider in the first direction decreases the volume of the exhaust section, and wherein adjustment of the divider in the second direction decreases the volume of the supply section.

6. The biosafety cabinet of claim 5, wherein adjustment of the divider in the first direction increases a flow rate of the air supplied to the supply section by the blower and decreases the flow rate of the air supplied to the exhaust section by the blower, and wherein adjustment of the divider in the second direction decreases the flow rate of the air supplied to the supply section by the blower and increases the flow rate of the air supplied to the exhaust section by the blower.

7. The biosafety cabinet of claim 1, wherein the blower is configured to simultaneously maintain (a) a supply air pressure within the supply section above an ambient air pressure, and (b) an exhaust air pressure within the exhaust section above the ambient air pressure.

8. The biosafety cabinet of claim 1, wherein the divider has a first end that is positioned adjacent an end of the plenum and a second end that is positioned adjacent the blower and an inlet of the plenum, wherein the adjuster is configured to move the second end of the divider to adjust the position of the divider in the plenum.

9. The biosafety cabinet of claim 8, wherein the adjuster comprises a cable that is attached to the second end of the divider, the cable configured to be pulled to adjust the divider in one of the first direction or the second direction, and the cable configured to be pushed to adjust the divider in the other of the first direction or the second direction.

10. The biosafety cabinet of claim 9, wherein a first end of the cable is attached to a bracket and a second end of the cable is attached to the second end of the divider, wherein a threaded rod engages a threaded surface of the bracket, wherein rotation of the threaded rod in a third direction moves the bracket to pull the cable and adjust the divider in one of the first direction or the second direction, and wherein rotation of the threaded rod in a fourth direction moves the bracket to push the cable and adjust the divider in the other of the first direction or the second direction.

11. The biosafety cabinet of claim 8, wherein the adjuster comprises a motor operable to move the second end of the divider.

12. A biosafety cabinet comprising:
 a plenum;
 a divider positioned in the plenum, the divider dividing the plenum into a supply section and an exhaust section;
 a blower positioned adjacent the plenum and in fluid communication with the plenum, the blower configured to simultaneously supply air to both the supply section and the exhaust section of the plenum;
 an exhaust filter positioned between the exhaust section and an exhaust outlet, wherein the air supplied to the exhaust section from the blower passes through the exhaust filter without entering the supply section;
 a supply filter positioned between the supply section and a work area, wherein the air supplied to the supply section from the blower passes through the supply filter without entering the exhaust section; and
 an adjuster coupled to the divider, the adjuster configured to adjust a position of the divider in the plenum.

13. The biosafety cabinet of claim 12, further comprising:
 a housing defining the work area and a front access opening through which the work area is accessible; and
 a recirculation duct in fluid communication with the work area and an inlet of the blower.

14. The biosafety cabinet of claim 12, wherein the exhaust filter comprises an inlet surface exposed to the exhaust section of the plenum, and wherein the exhaust section of the plenum is configured so that there is an unrestricted airflow path in the exhaust section from the blower to the inlet surface of the exhaust filter.

15. The biosafety cabinet of claim 12, wherein the blower is configured to simultaneously maintain (a) a supply air pressure within the supply section above an ambient air pressure, and (b) an exhaust air pressure within the exhaust section above the ambient air pressure.

16. The biosafety cabinet of claim 12, wherein the divider has a first end that is positioned adjacent an end of the plenum and a second end that is positioned adjacent the blower and an inlet of the plenum, wherein the adjuster is configured to move the second end of the divider to adjust the position of the divider in the plenum.

17. The biosafety cabinet of claim 16, wherein the adjuster comprises a cable that is attached to the second end of the divider, the cable configured to be pulled to adjust the divider in a first direction, and the cable configured to be pushed to adjust the divider in a second direction.

18. The biosafety cabinet of claim 17, wherein a first end of the cable is attached to a bracket and a second end of the cable is attached to the second end of the divider, wherein a threaded rod engages a threaded surface of the bracket, wherein rotation of the threaded rod in a third direction moves the bracket to pull the cable and adjust the divider in the first direction, and wherein rotation of the threaded rod in a fourth direction moves the bracket to push the cable and adjust the divider in the second direction.

19. The biosafety cabinet of claim 16, wherein the adjuster comprises a motor operable to move the second end of the divider.

20. A biosafety cabinet comprising:
a plenum;
a divider positioned in the plenum, the divider dividing the plenum into a supply section and an exhaust section;
a blower positioned adjacent the plenum and in fluid communication with the plenum, the blower configured to simultaneously supply air to both the supply section and the exhaust section of the plenum;
an exhaust filter positioned between the exhaust section and an exhaust outlet, wherein the exhaust filter comprises an inlet surface exposed to the exhaust section of the plenum, wherein the air supplied to the exhaust section from the blower passes through the exhaust filter, and wherein the exhaust section of the plenum is configured so that there is an unrestricted airflow path in the exhaust section from the blower to the inlet surface of the exhaust filter;
a supply filter positioned between the supply section and a work area, wherein the air supplied to the supply section from the blower passes through the supply filter; and
an adjuster coupled to the divider, the adjuster configured to adjust a position of the divider in the plenum.

21. The biosafety cabinet of claim 20, further comprising:
a housing defining the work area and a front access opening through which the work area is accessible; and
a recirculation duct in fluid communication with the work area and an inlet of the blower.

22. The biosafety cabinet of claim 20, wherein the blower is configured to simultaneously maintain (a) a supply air pressure within the supply section above an ambient air pressure, and (b) an exhaust air pressure within the exhaust section above the ambient air pressure.

23. The biosafety cabinet of claim 20, wherein the divider has a first end that is positioned adjacent an end of the plenum and a second end that is positioned adjacent the blower and an inlet of the plenum, wherein the adjuster is configured to move the second end of the divider to adjust the position of the divider in the plenum.

24. The biosafety cabinet of claim 23, wherein the adjuster comprises a cable that is attached to the second end of the divider, the cable configured to be pulled to adjust the divider in a first direction, and the cable configured to be pushed to adjust the divider in a second direction.

25. The biosafety cabinet of claim 24, wherein a first end of the cable is attached to a bracket and a second end of the cable is attached to the second end of the divider, wherein a threaded rod engages a threaded surface of the bracket, wherein rotation of the threaded rod in a third direction moves the bracket to pull the cable and adjust the divider in the first direction, and wherein rotation of the threaded rod in a fourth direction moves the bracket to push the cable and adjust the divider in the second direction.

26. The biosafety cabinet of claim 23, wherein the adjuster comprises a motor operable to move the second end of the divider.

* * * * *